(12) United States Patent
Mancuso et al.

(10) Patent No.: US 6,456,323 B1
(45) Date of Patent: Sep. 24, 2002

(54) COLOR CORRECTION ESTIMATION FOR PANORAMIC DIGITAL CAMERA

(75) Inventors: Massimo Mancuso, Monza (IT); Emmanuel Lusinchi, San Diego; Patrick Cheng-san Teo, San Mateo, both of CA (US)

(73) Assignees: STMicroelectronics, Inc., Carrollton, TX (US); MGI Software Corporation, Richmond Hill, CA (US)

( * ) Notice: Subject to any disclaimer, the term of this patent is extended or adjusted under 35 U.S.C. 154(b) by 0 days.

(21) Appl. No.: 09/476,652

(22) Filed: Dec. 31, 1999

(51) Int. Cl.⁷ .......................... H04N 5/225; H04N 9/73; G06K 9/36
(52) U.S. Cl. .................. 348/218; 348/223; 382/284
(58) Field of Search ................. 348/223, 218, 348/36, 37, 38, 39, 584; 382/284

(56) References Cited

U.S. PATENT DOCUMENTS

| | | | |
|---|---|---|---|
| 5,138,460 A | 8/1992 | Egawa | |
| 5,657,402 A | * 8/1997 | Bender et al. | 348/218 |
| 5,682,197 A | 10/1997 | Moghadam et al. | |
| 5,940,641 A | 8/1999 | McIntyre et al. | |
| 5,982,951 A | * 11/1999 | Katayama et al. | 382/284 |
| 6,128,108 A | * 10/2000 | Teo | 382/284 |

* cited by examiner

*Primary Examiner*—Wendy R. Garber
*Assistant Examiner*—Rashawn N Tillery
(74) *Attorney, Agent, or Firm*—Lisa K. Jorgenson; Stephenson Bongini

(57) ABSTRACT

A method for correcting color in a system for creating a panoramic image from a plurality of images taken by a camera. The method comprising the steps of: receiving a color channel from at least a first image and a second image; creating an overlap portion between the first image and second image; and adjusting the color channel for the first image and for the second image in at least the overlap portion between the first image and the second image which is independent of motion estimation.

In an alternate embodiment, a system and computer readable medium corresponding to the above method is described.

15 Claims, 30 Drawing Sheets

VERTICAL DOWNSAMPLING

HORIZONTAL DOWNSAMPLING

θ_orgin
(of current view)

*4808*

$Y_s = Y\_scale \cdot Y_d$
$Y\_scale = {}^2FL/sqrt({}^2X_d + 1)$

*4806*

*4812*

COLOR CORRECTION ESTIMATION FOR PANORAMIC DIGITAL CAMERA

CROSS-REFERENCE TO RELATED APPLICATIONS

This application relates to technology similar to U.S. patent applications Ser. No. 09/477,037, Ser. No. 09/477,036, Ser. No. 09/477,919, Ser. No. 091477,118, and Ser. No. 09/477,117, all being filed concurrently herewith and commonly assigned herewith to STMicroelectronics Inc. and which are hereby incorporated by reference in their entirety hereinto.

BACKGROUND OF THE INVENTION

1. Field of the Invention

The invention disclosed broadly relates to the field of image processing and more specifically to image processing in a digital camera for taking panoramic pictures.

2. Description of the Related Art

Today, panoramic photography is accomplished in various ways. One is to use a still camera mounted on a tripod to take a succession of shots as the camera is pivoted around the tripod. In some cameras, a wider than usual strip of film is exposed with special movable optics.

In other cameras, conventional format film, such as 35 mm film, is masked during the exposure in the camera to provide a panoramic effect. The effect is panoramic but the whole exposure is limited by the field of view through the lens.

Other techniques for creating panoramic photography include to physically cut and paste together strips of exposed film by carefully aligning boundaries between edges of film.

The benefits of electronic photography have led to the growth of digital cameras, that, unlike their film-based counterparts, store images captured in memory into digital memory such as flash memory. To provide panoramic photography effects, these digital cameras can interface with personal computers for joining together two or more images into one image to provide a panoramic effect by joining edge boundaries of images. One such system is disclosed in U.S. Pat. No. 6,682,197, by named inventors Omid A. Moughadam, Stuart R. Ring, and John R. Squilla, entitled "Electronic Panoramic Camera For Use With An External Processor."

Complicated panoramic digital cameras are available that rely on position sensors or satellite communications for determining position coordinates. These position coordinates are used to help combine the panoramic images. The process of combining scenes taken from different camera orientations is known as "Image Stitching." One such system is disclosed in U.S. Pat. No. 5,262,867 by named inventor Kiyonobu Kojima entitled "Electronic Camera and Device for Panoramic Imaging and Object Searching" issued on Nov. 16, 1993.

A panoramic camera with a memory device for storing data from a previously photographed portion of an object and a control device for enabling the display device to substantially display both the image to be photographed and the image already photographed and stored in the memory space is described in U.S. Pat. No. 5,138,460 by named inventors Egawa and Akira entitled "Apparatus for forming Composite Images" issued on Aug. 11, 1992.

Although these techniques are useful, they are not without their shortcomings. One shortcoming is the expense and complication arising from the need for orientation and position sensors for determining picture orientation. Accordingly, a need exists for a device and method to create panoramic pictures without the need and expense of position sensors.

Another shortcoming of the current panoramic cameras is how difficult it is to properly overlap a region between two adjacent frames of a panoramic image. Too much overlap results in wasting memory in the digital camera with redundant information.

Another shortcoming with current panoramic cameras is their inability to guide the user where the correct edge overlap is required for creating a panoramic picture alignment from two or more images. Accordingly, a need exists to overcome this problem and to guide the user of a camera using a method and apparatus to overlap two or more images to provide a correct panoramic picture.

Another shortcoming of the current panoramic cameras is the requirement to overlap regions of two or more images. It is common with panoramic image generation to stitch together two or more images. Problems at the boundaries of two images include color distortion, perspective distortion, pixel adjacency and skipped pixels at the edges when joining two or more images. Accordingly, a need exists for a method and apparatus to overcome these shortcomings.

Another shortcoming of the current panoramic cameras is their inability to integrate these mechanisms with other products. The bulk, expense, and complication make these designs difficult to integrate. Accordingly, a need exists for a method and apparatus to allow easy integration of panoramic capabilities into other electronic devices.

Another shortcoming is the inability to easily capture two or more images to create a panoramic scene without the need for expensive computational resources in the camera and without the need for expensive position sensors. Accordingly, a need exists for a method and apparatus to provide a camera which can capture two or more images so as to create a panoramic image.

Another shortcoming is the requirement of having two distinct buffers to transform the captured image from one coordinate system to another coordinate system, such as rectilinear coordinates to cylindrical coordinates. The expense and space required for two buffers for coordinate transformations is undesirable. Accordingly, a need exists to provide a method and apparatus that can transform images from one coordinate system to another coordinate system, without the use of two buffers.

Another shortcoming with current panoramic cameras is the perspective of the series of images relative to each other is lost. One known procedure uses sub-sampling. The picture is scaled down so that the horizontal dimension will match the horizontal extent of the view-port. However, the picture must become a narrow stripe in order to maintain the correct aspect ratio. This will produce a great loss of vertical resolution. Another solution is to scroll the panoramic image horizontally by a fixed amount. In this case no sub-sampling is used, provided that the vertical dimension of the picture will fit the vertical dimension of the view-port. Accordingly, a need exists to provide a method and apparatus to create a moving display of still pictures with perspective without the need to sub-sample or to horizontal scroll.

Still another shortcoming with current panoramic cameras is the requirement that all the image processing electronic circuitry for the final stitching together of one or more images in a series into a single panoramic image is integrated into the camera. Many times, the added expense, the additional weight and the additional size of the electronic circuitry make the camera unwieldy to carry and operate. Moreover, the additional electronic circuitry makes the camera more expensive to manufacture. Accordingly, a need exists for a method and apparatus to enable the preview of a series of adjacent images to form a panoramic, but to enable the final image stitching processing on a remote device such as a personal computer.

SUMMARY OF THE INVENTION

A method for correcting color in a system for creating a panoramic image from a plurality of images taken by a camera. The method comprising the steps of: receiving a color channel from at least a first image and a second image; creating an overlap portion between the first image and second image; and adjusting the color channel for the first image and for the second image in at least the overlap portion between the first image and the second image which is independent of motion estimation.

In an alternate embodiment, a system and computer readable medium corresponding to the above method is described.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1:
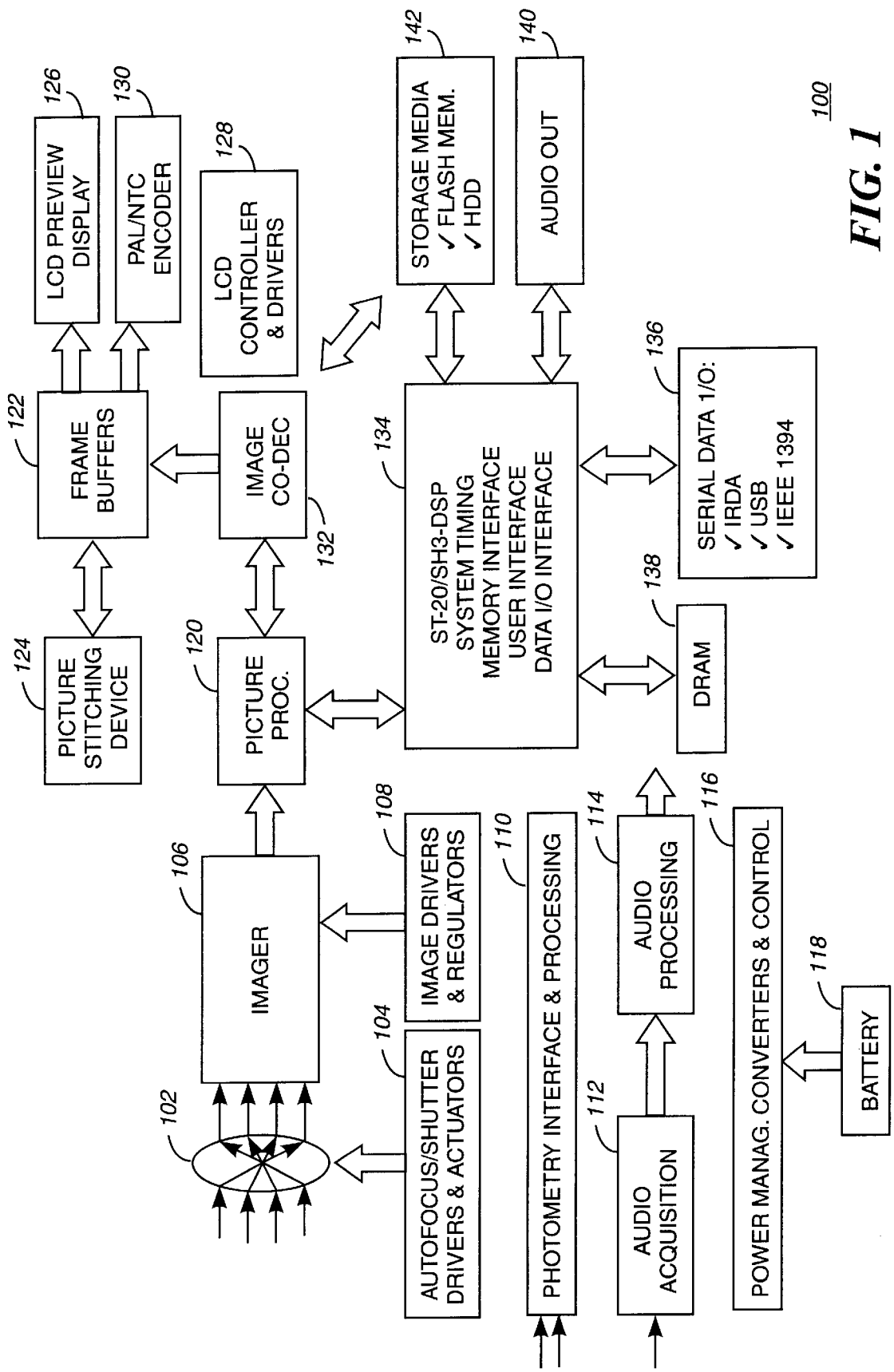
FIG. 1 is a block diagram of a digital still camera according to one aspect of the present invention.

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

1. GLOSSARY OF TERMS USED IN THIS DISCLOSURE

Actual Next Picture—the picture that is actually captured as the next addition to the set of pictures constituting the Panorama.

Bottom-to-Top Vertical Panorama—a Panorama captured by taking a set of pictures by rotating the camera up (from bottom to top) between each capture, with as little horizontal displacement as possible.

Current Buffer—a cylindrically warped version of the current picture.

Current Picture/Current View/Current Frame—a picture displayed on the camera LCD screen and that is updated in real time. If the LCD screen is not used or if there is no LCD screen, it is the picture that would be captured at any given moment if the capture button was pressed.

Ideal Next Picture—in a Left-to-Right Horizontal Panorama, the picture that would be obtained if the camera was positioned so that the Previous Picture and Ideal Next Picture have an Overlay Part Length equal to the Set Overlay Part Length and no vertical displacement. In a Left-to-Right Horizontal Panorama, the overlay part is on the right of the Previous Picture and on the left of the Ideal Next Picture.

Ideal Position of the Camera for the Ideal Next Picture—The position of the camera that allows to capture the Ideal Next Picture.

Image Stitching—the process of digitally combining scenes taken from different camera orientations.

Left-to-Right Horizontal Panorama—a Panorama captured by taking a set of pictures by rotating the camera clockwise (from left to right) between each capture, with as little vertical displacement as possible.

Overlay Part Length—in a Horizontal Panorama, the width of the overlay part. It is expressed in term of percentage of the whole picture width.

Overlay Part of A Picture—the part of the picture picturing the overlay zone.

Overlay Zone of Two Pictures—the part of a scene that is present in the two pictures.

Panoramic—an image with at least one dimension such as height or width which is greater in dimension of a single capturing device and often involves a series of images. A picture created from a set of pictures and that has at least one dimension bigger than the corresponding dimensions of a source picture.

Preview Strip—a computed image created through digital processing of the overlay part of the Previous Picture and that strives to predict what the overlay part of the Ideal Next Picture will look like.

Previous Buffer—a cylindrically warped version of the Previous Picture.

Previous Picture/Previous Frame—a picture that has already been captured and that is the latest addition to the set of picture constituting the Panorama.

Right-to-Left Horizontal Panorama—a Panorama captured by taking a set of pictures by rotating the camera anticlockwise (from right to left) between each capture, with as little vertical displacement as possible.

Set Overlay Part Length—a constant Overlay Part Length for each pair of pictures constituting the Panorama. The Set Overlay Part Length is the fixed length chosen for a given Panorama.

Top-to-Bottom Vertical Panorama—a Panorama captured by taking a set of pictures by rotating the camera down (from top to bottom) between each capture, with as little horizontal displacement as possible.

2. PICTURE STITCHING CAMERA

Referring now in more detail to the drawings in which like numerals refer to like parts throughout several views, shown in FIG. 1 is a block diagram of a digital still camera 100 according to one aspect of the present invention. A digital camera comprises one or more optical lenses 102 with an autofocus/shutter, driver and actuator 104 and associated photometry interface 108 such as autofocus, auto shutter and contrast control. An imager 106 such as an CCD or equivalent 104 converts an image projected through optical lens 102 to a series of pixels 106. Regulators and image drivers 108 allow regulation of the imager 106. An audio acquisition device 212, such as microphone, along with audio processing circuitry 214, allows a user to make aural recordings along with digital images. A battery 118 with power management circuitry 118 allows the camera 100 to work as a portable device. A picture processor 116, provides pixel information to one or more frame buffers 118 coupled to picture stitching device 120 which is described further below. In this embodiment, the picture stitching device 120 is implemented as an ASIC. A LCD display 122 or equivalent enables a user to view the image projected through lens 102 into imager 106 and controlled by LCD controller 134. A PAL/NTSC 124 encoder provides an interface to other display types. An image CODEC 132 coupled to picture processor 116 provides known image enhancement effects for the picture processor 116. A DSP 124 such a STMicroelectronics ST-20/SH3-DSP is used to control the memory interface and the data I/O 126 such at Infra-Red, Universal Serial Bus or other interfaces. A DRAM provides execution memory for the DSP 124 to perform Image Stitching algorithms as described below. An audio output 130 such as a speaker provides the user aurally playback. All of these components are representative components of the digital camera 100. Storage media 136 such as Flash memory, diskettes or removable hard drives store each image and associated audio. In one embodiment, the algorithms carrying out the steps for Image Stitching described below are stored on the storage media 136 along with captured images and audio. Processing for the images may occur prior to or after the image is store in storage media 136. The general operation of a digital camera comprising most elements described herein is well understood and those skilled in the art.

One or more user inputs via the LCD Controller 128 provides user control over camera functions such as the orientation of the panoramic e.g., horizontal or vertical, and the direction of movement such as a Left-to-Right Horizontal Panoramic, a Right-to-Left Horizontal Panoramic; a Top-to-Bottom Vertical Panoramic; and a Bottom-to-Top Vertical Panoramic. Other user input such as the optional features and desired effects and to set system parameters such as:

Panorama mode on/off.
Panorama parameters.
  Left-to-Right Horizontal mode.
  Right-to-Left Horizontal mode.
  Top-to-Bottom Vertical mode.
  Bottom-to-Top Vertical mode.
  Set Overlay Part Length.
Preview display on/off.
Mixing mode parameters.
  Alpha blending on/off.
  Alpha blending parameters such as alpha blending ratio.
  Interlaced block mode on/off.
  Interlaced block pattern selection.

Figure 2:
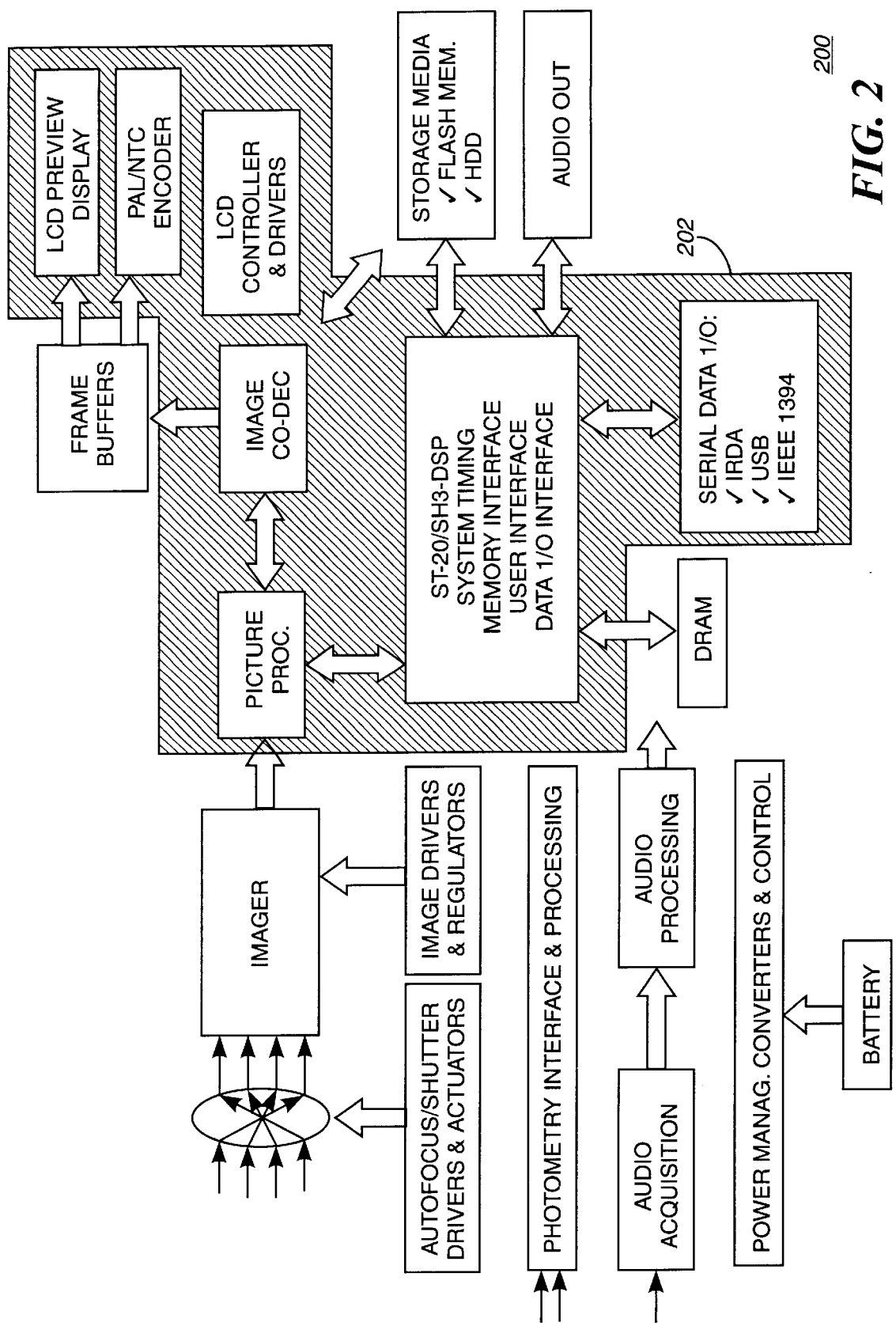
FIG. 2 is a block diagram of the picture stitching device of FIG. 1 in another embodiment integrated as a standard cell in a semi-custom semiconductor device, according to the present invention.
Figure 3:
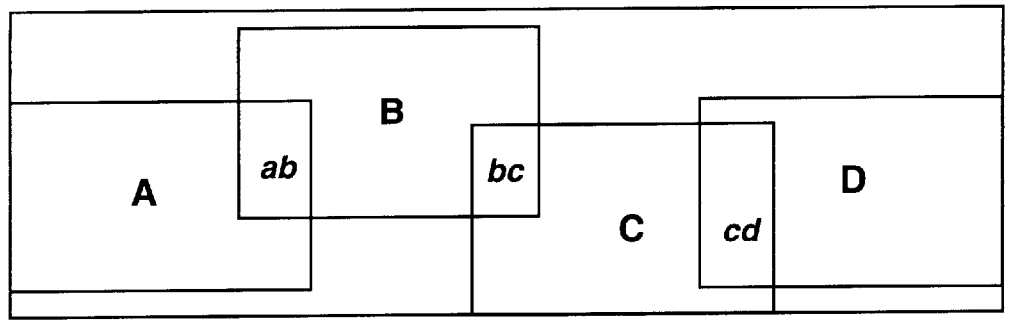
FIG. 3 is a block diagram of a series of individual horizontal still images comprising a panoramic image with overlapping regions, according to the present invention.

In another embodiment, many of the components of FIG. 1 are embedded in as part of a standard cell in a semi-custom semiconductor device. FIG. 3 is an block diagram 300 of the picture stitching device of FIG. 2 in another embodiment integrated as a standard cell in a semi-custom semiconductor device, according to the present invention. In this embodiment, the picture stitching device 124 and picture processor 120 are physically implemented as one unit. The DSP 134, serial I/O 136, image CODEC 132, LCD preview and display 126, PAL/NTSC encoder 130 and LCD controller & drivers 126 are all integrate as one device 200. To those skilled in the art, it will be obvious to substitute and modify this exemplary single device 300 to include the picture stitching device 124 and DSP 224 with other circuitry as well.

3. PANORAMIC CAPTURING OVERVIEW

Turning now to FIG. 3 shown is a series of four images 300 labeled A, B, C, and D with overlap edges parts ab, bc, cd between. These four images are joined together to form one Panoramic image. It is important to note that the Panoramic images can be from Left-to-Right as shown in FIG. 3 or Right-to-Left for a Horizontal Panoramic. For a Vertical Panoramic, (not shown) the series of images can run from top- to-bottom or from bottom-to-top. Accordingly, this present invention is not limited to one type of horizontal or vertical orientation, and four types of panoramic images are disclosed: a Left-To-Right Horizontal Panoramic; a Right-to-Left Horizontal Panoramic; a Top-to Bottom Vertical Panoramic; and a Bottom-to-Top Vertical Panoramic.

Figure 4:
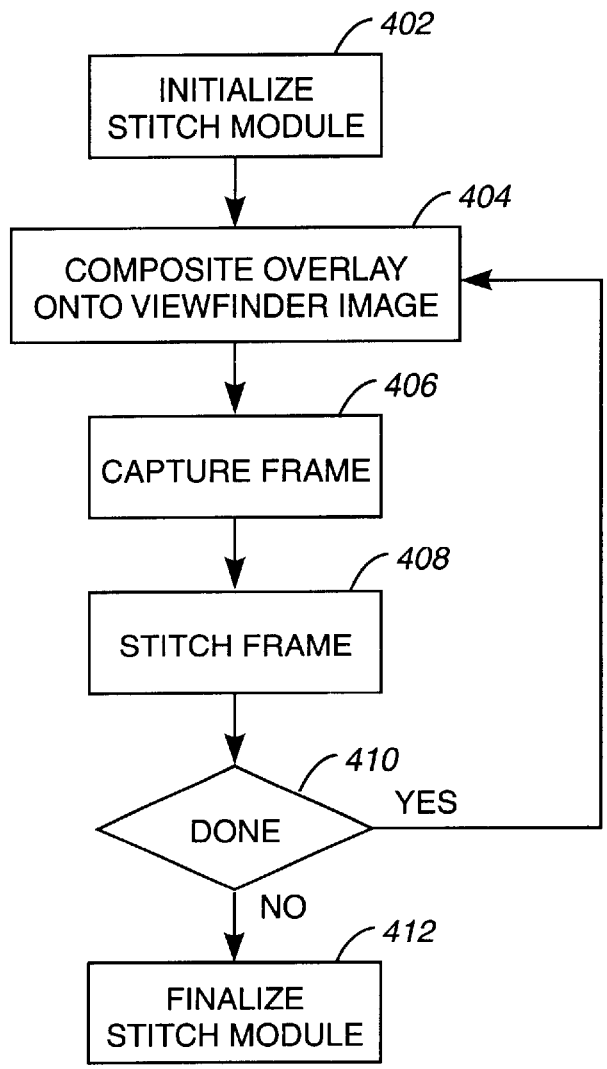
FIG. 4 is a flow diagram of the overall image acquisition process of the horizontal images of FIG. 3 using the digital still camera of FIG. 1, according to the present invention.

FIG. 4 is a flow diagram 400 of the overall image acquisition using the digital still camera of FIG. 1, according to the present invention. After this overall process is described, a more detailed description of the process steps of FIG. 4 are described below. The digital camera 100 acquires a series of images to form a panoramic image, such as the series of Left-To-Right Horizontal Panoramic A, B, C, D with overlap edge parts ab, bc, cd of FIG. 3. The overall image acquisition process begins with the initialization of the digital camera 100. The user inputs from the LCD controller setting up the orientation of the panoramic, such as horizontal or vertical and other system parameters for picture stitching device 124 are set, step 402. The next image is located in the view finder of digital camera 100. Returning to the example in FIG. 3, if the image is A, it is the first image, if the image is B,C, or D it is the next image and the regions of overlap ab, bd, and cd for each image pair is made as a composite. Once the image either the first frame or the successive frames with the desired overlap are aligned in the view finder of digital camera 100, the so called Ideal Next Picture, is created. The region of overlap, called the Preview Strip, is a composite of both the Previous Picture and the Current Picture. The Preview Strip comprises a perspectively corrected Previous Picture in the region overlap. The Preview Strip assists the user in aligning the Current Picture and the Previous Picture. The Current View is stitched together with the Previous View, in the stitch frame step, 408. A test is made to see if the last image had been stitched. Referring again to FIG. 3 that is whether image D has been stitched with image C using overlap region cd. If the last image is not been stitched then the process returns to step 404 until the last image has been stitched, step 410. Once the last image is stitched final corrections to the overall image and overall data is made, step 412. After the first frame is acquired, a perspectively-corrected strip of the Previous Frame is overlaid on the Current Frame to aid the user in acquiring the Current Frame. For example, if a Horizontal Panorama is being acquired from left-to-right, a strip from the right portion of the Previous Frame is perspectively corrected and overlaid on the left portion of the Current Frame in the viewfinder. After each frame is acquired, the stitch module is invoked with the new frame buffer. The stitch module aligns and blends the new frame into the Panorama, and incrementally saves out the Panorama. After the last frame is acquired and stitched, the Finalize Stitch module is called to save out any remaining data.

Figure 5:
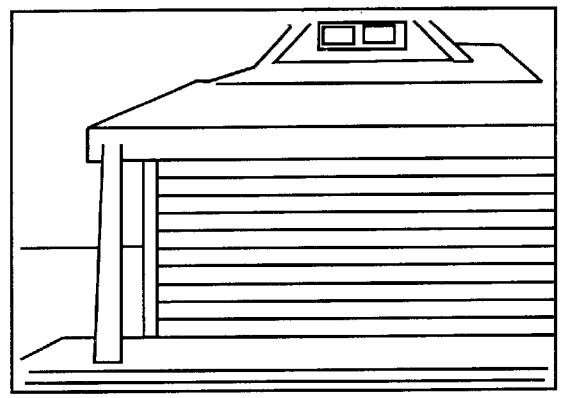
FIG. 5 is an illustration of a Previous Picture for demonstrating the composite overlay and perspective correction of the preview strip the overall image acquisition process of FIG. 4, according to the present invention.
Figure 6:
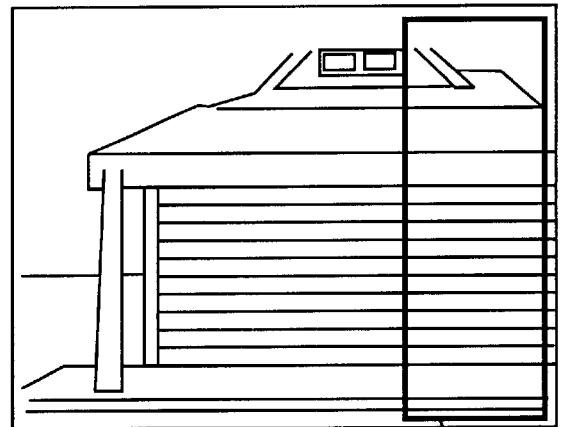
FIG. 6 is an illustration of a selected overlap region of FIG. 5, according to the present invention.
Figure 7:
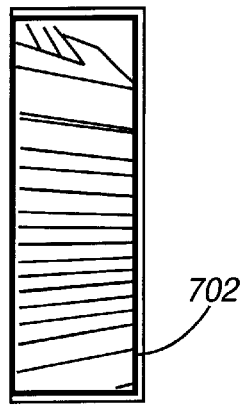
FIG. 7 is an illustration of the corrected perspective of overlap region of FIG. 6 for aligning the Ideal Next Picture, according to the invention.
Figure 8:
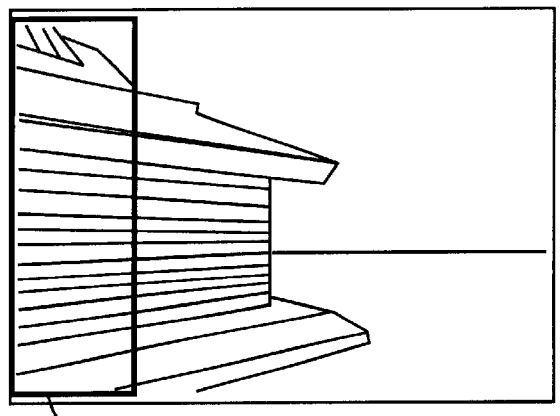
FIG. 8 is an illustration of the Current Picture with an Ideal Next Picture guided by the overlap generated in FIG. 7, according to the present invention.

Turning now to FIGS. 5–8 is an illustration of a series of Left-to-Right Horizontal Panorama images illustrating the perspective correction of FIG. 4 as seen by the user of the digital camera 100, according to the present invention. Note the capturing of the Current Picture with an Ideal Next Picture guided by the overlap generated edge 602. In FIG. 5, an image is captured in the digital camera 100, this becomes the Previous Picture 500. A Preview Area 602 is shown from the Previous Picture 502 to user in FIG. 6. FIG. 7 illustrates how the Preview Area 602 is perspectively corrected or warped 702 to assist the user in aligning the Current Picture 800 in FIG. 8. Notice the perspectively corrected Preview Area 702 makes aligning the Current Picture 800 much easier. As shown in FIG. 8, a Preview Strip 702 is generated from the overlay part 602 of the Previous Picture 500. Note the similarity between the generated Preview Strip 702 and the Current View 800 overlay part. The computed Preview strip 702 is used as a visual clue, displayed on the LCD 126 of digital camera 100, to help the user position the camera 100 until the Current View 800 matches the Preview Strip 702.

The computed Preview Strip 702 can be displayed on the digital camera 100 in various way to help the user in precisely placing the camera in the desired position. One way is to alpha blend (with adjustable coefficient) the preview with the current display of the scene on the LCD 126. In another embodiment, the interlace some blocks of the preview with the displayed Current View on the digital camera 100. Further information on blending is described below.

4. HIGH LEVEL PICTURE STITCHING DEVICE ARCHITECTURE

Figure 9:
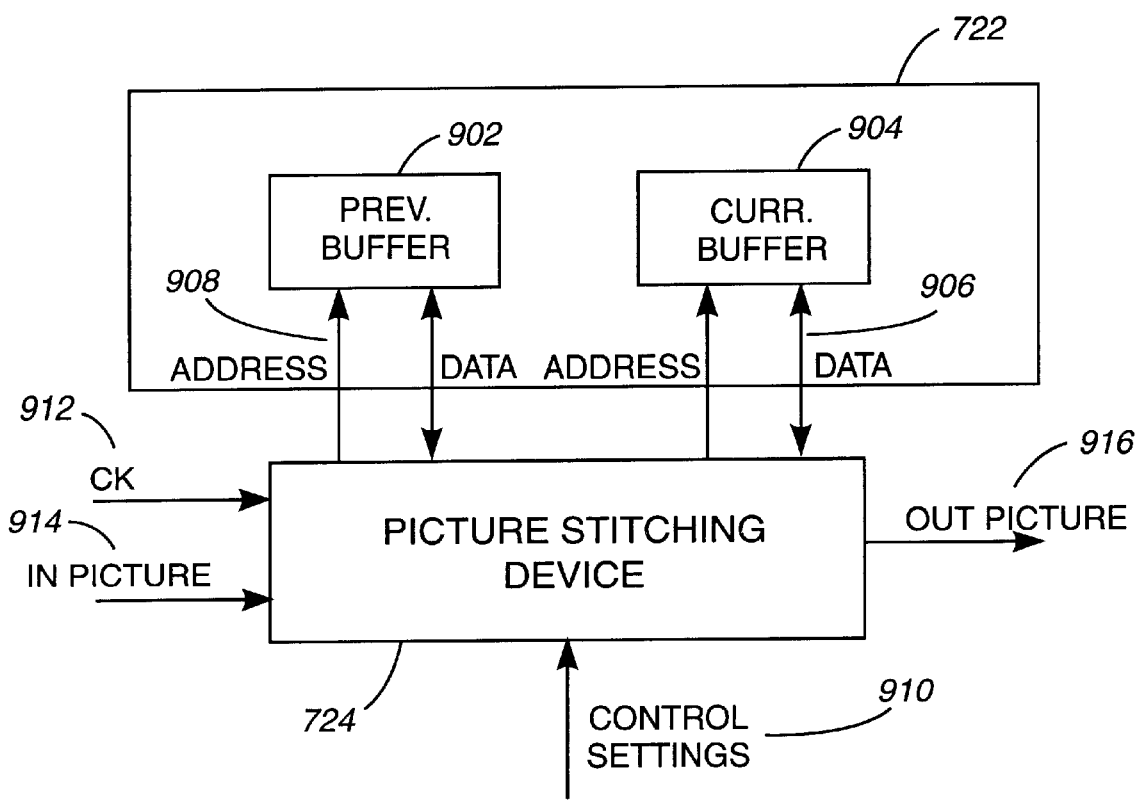
FIG. 9 is a high level block diagram of a picture stitching device of FIG. 1, according to the present invention.

FIG. 9 is a high level block diagram 900 of a picture stitching device 124 of FIG. 1, according to the present invention. The Frame Buffers 122 comprise a Previous Buffer 902 (or prevBuf) and a Current Buffer 904 (or curBuf). The Previous Buffer 902 and Current Buffer 904 are coupled to the picture stitching device 124 through a set of address 906 and data lines 908. A clock input 912 provides timing inputs to the picture stitching device 124. A picture input from the imager 106, provides the digital image to the picture stitching device 124. An output labeled out picture 916, provides an output from the picture stitching device 124 to other devices such as the Image CODEC 132 and DSP 134. An input labeled Control settings 910, provides parameter input to picture stitching device 124. Parameter input includes, the size of the Previous Buffer 902 and the Current Buffer 904, the amount of overlap region between images, types of color correction, and more. The Previous Buffer 902 is a memory devices containing the Previous Picture, its sub-sampled version and all the information related to it and required by the algorithms. The Current Buffer 904 is memory devices containing the Current Picture, its sub-sampled version and all the information related to it and required by the algorithms. The two buffers can be implemented either as two separated physical devices or one physical device and in this case the distinction is logical only. The stitching device requires four types of buffers of different sizes: (1) two working buffers each the size of the image frame of the digital camera; (2) one buffer for the overlay area or Preview Strip; (3) four down sample working buffers for motion estimation, described later on; and (4) several other smaller buffers and registers for calculations. The detailed process flow of stitching using picture stitching device 124 is now described.

A. Stitching Overview

Figure 10:
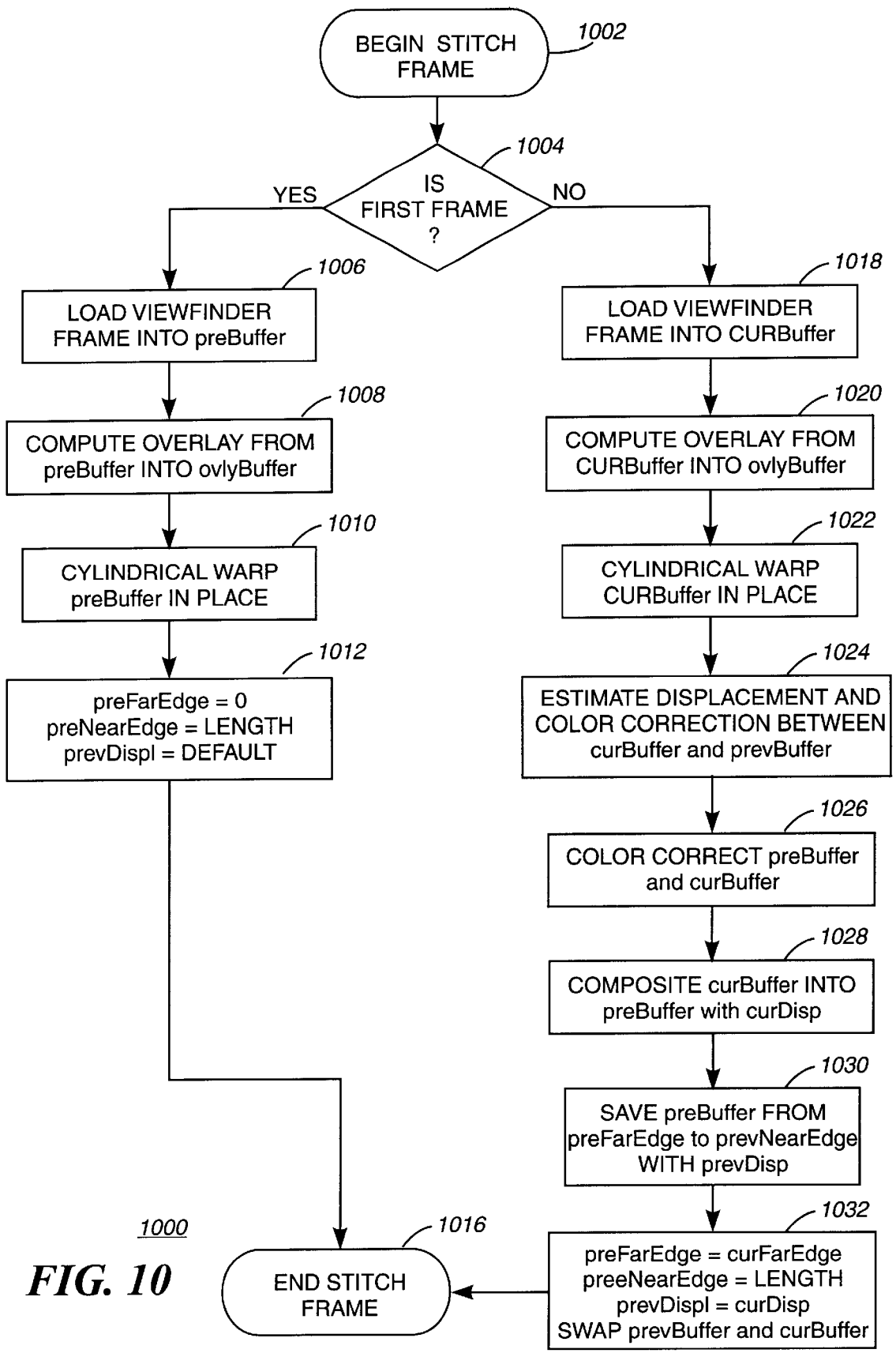
FIG. 10 is a detailed flow diagram of the stitching overview of FIG. 4, according to the present invention.
Figure 18:
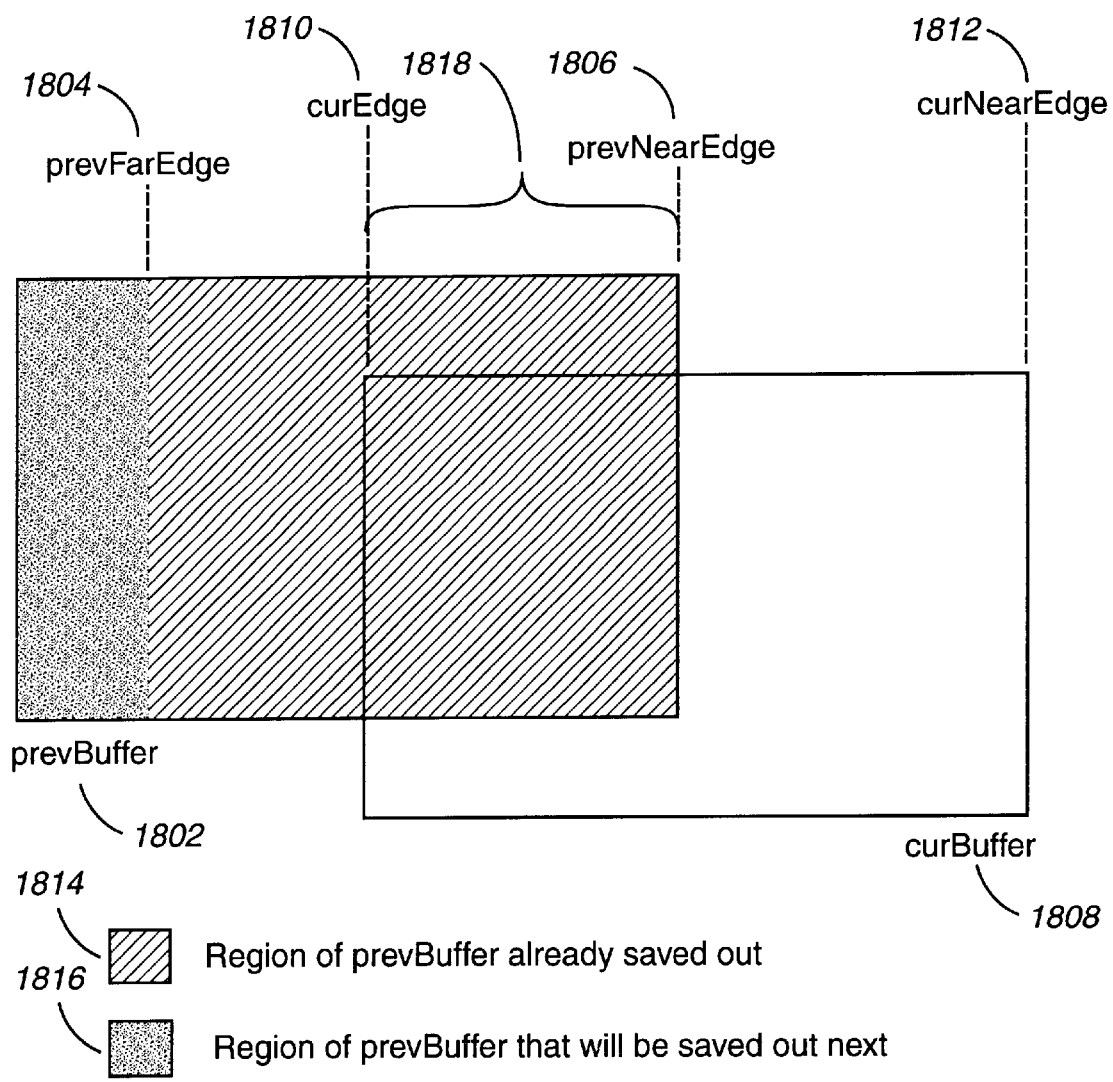
FIG. 18 is an illustration of the areas of measurement for two adjacent figures, such as images A and images B of FIG. 3, according to the present invention.

The stitching overview of FIG. 4 is now described in further detail. FIG. 10 is a detailed flow diagram of the stitching overview of FIG. 4, according to the present invention. Each of these process steps are described further below along with an exemplary hardware implementations. To aid with the understanding of the concepts in the process flow of FIG. 10 for the Previous Buffer 902 and Current Buffer 904 references are made to FIG. 18 which illustrates the areas of measurement for two adjacent images of FIG. 3, such as images B and C. The stitching process is managed around the two working frame buffers 122 the Previous Buffer 902 and the Current Buffer 904. In general the Previous Buffer 902 contains a cylindrically warped version of the Previous Picture and the Current Buffer 904 contains a cylindrically warped version of the Current Picture 800. To illustrate the digital image contents of the Previous Buffer 802, the term prevBuffer 1802 is used. The prevBuffer 1802 has a preFarEdge 1804 which corresponds to the left edge of the Previous Buffer 902 and a preNearEdge 606 which corresponds to a right edge of the Previous Buffer 902. The curBuffer 1808 is a graphically illustration of the digital image contents stored in Current Buffer 904. The curBuffer 1808 has curFarEdge 1810 which corresponds to the left edge of the Current Buffer 904 and curNearEdge 1812 which corresponds to the right edge of the Current Buffer 904. In general the near and far edges do not have to correspond to the true edges of the Previous Buffer 902 or the Current Buffer 904. In a vertical panoramic orientation, the curFarEdge 1810 and the curNearEdge 1812 correspond to the top edge of the Current Buffer 904 and the bottom edge of the Current Buffer 904 respectively. The Previous Buffer 902 also has the top edge and bottom edge correspond to the prevFarEdge 1804 and the prevNearEdge 1806. The overlap region 1818 is defined by the curFarEdge 1810 on the left and the preNearEdge 1806 on the right.

The process flow of stitching is divided into two cases: (1) stitching the first frame, and (2) stitching the subsequent frames. The process flow begins, step 1002 and a determination if the first frame has been captured, step 1004. If the frame is the first frame, such as A of FIG. 3, the Current View is loaded directly into the prevBuffer 1802, step 606. In step 1008, the desire amount of overlay between successive images is computed, such as the overlay regions ab, bc and cd of FIG. 3. In one embodiment, the amount of overlay is a system parameter that is set by the user. An in place transformation such as a rectilinear in place transformation to perspectively correct the Overlay Buffer 1818 (ovrlyBuffer).

The overlay region 1818, also referred to as the Preview Strip 702, contains a picture obtained from the previous picture and which and which has been transformed digitally in order to match the perspective for the ideal current picture. This overlay picture contained in the overlay region 1818 is used to guide the user in position in the camera so that he/she will capture a current picture as close as possible to the ideal current picture. The image contained in the overlay region 1818 can be obtained from the previous picture in cylindrical representation or from the previous picture in rectangular representation. Obtaining the overlay picture from the cylindrical representation does not require any additional processing block, for it is the same transformation used in the Motion Picture Playback Module described further in Section 6 "Motion Play-Back of Still Picture That Have Been Previously Save", below. However, in the this embodiment, the overlay region 1818 is in a rectangular representation. The use of a rectangular representation yields a better picture quality since only one digital transform is used while two are needed when using the cylindrical source. The use of an in-place cylindrical transform, means that the rectangular coordinate picture is overwritten by the cylindrical coordinate picture. And it is necessary to perform the computation and saving of the overlay region 1818 in the overlay buffer prior to or before the in-place rectilinear-to-cylindrical transform occurs. Once the overlay region 1818 is estimated to correct perspective for the next image is calculated, step 610. The parameters for stitching are set as follows:

preFarEdge=0;
preNearEdge=length;
prevDispl=default.

Where length is the length of overlap between the images, and default is a displacement value whose value is set to be greater than zero and less the length of overlap. The value is the displacement along normal to the direction of orientation for the panoramic. Stated differently, for a horizontal panoramic, the default would be the maximum vertical displacement. And the stitching for this first frame is complete, step 1016. The Current View is loaded into the curBuffer 1808, step 1019, a preview of the curBuffer 1808 into the overlay region 1818 of the Current Buffer 904 is done to assist the user in aligning the two images at the region of overlap. Returning to FIG. 3, the region of overlap between the first image A and the second image B is ab. The user is trying to capture the Ideal Next Picture by positioning the digital camera 100 to align the region of overlap using a perspectively corrected Preview Strip 702. As described below, the Previous Picture 500 and the Current Picture 800 at the region of overlap are superimposed, one on top of the other to assist the user in the Ideal Position of the camera 100. Once the image is captured, it is cylindrically warped in place, step 1022. At this point both the prevBuffer 1802 and the curBuffer 1808 are in cylindrical coordinates. Next, the displacement between the previous and current picture (also called motion estimation), between the prevBuffer 1802 and the curBuffer 1808 is computed along with color correction between the prevBuffer 1802 and the curBuffer 808, step 524. In one embodiment, the color correction is performed on the prevBuffer 1802 between prevFarEdge 1804 and preNearEdge 1806. And at the same time, color correction is also performed on curBuffer 1808 from curFarEdge 1810 up to the curNearEdge 1812. Color correction is not performed on the region of prevBuffer 1802 that has already been saved out, step 1014. After the color correction the overlap region of the two buffers are linearly composited, steps 1026 and 1028. Note in another embodiment, the color correction is performed in combination with areas of the picture already save out, to yield a smoother color variations since the color change could gradually speared on a bigger surface.

Next, the prevBuffer 1802 from prevFarEdge 1804 to preNearEdge 1806 with preDisp (previous displacement or previous motion estimation) is saved, step 1030. The region of prevBuffer 1802 between prevFarEdge 1804 and prevNearEdge 1806 is save out to image memory, such as storage media 142. Since all the prevBuffer 1802 would have been saved out a this time, the contents of Previous Buffer 1602, that is the image prevBuffer 1802 are no longer needed. Now the curBuffer 1808 becomes the prevBuffer 1802 and the prevBuffer 1802 becomes the curBuffer 1808. Stated differently the curBuffer 1808 and prevBuffer 1802 are swapped. Finally, the system parameters are set as follows:

prevFarEdge=length−curFarEdge;
prevNearEdge=length;
prevDisp=curDisp.

Now further details on the Picture Stitching Device 124 are described. The description begins with an exemplary hardware implementation followed by examples of the processes implemented by each hardware section.

B. Mixing the Preview Strip With the Current View

There are several methods to mix the preview strip with the Current View. Methods that are discussed are: Alpha Blending; Alpha Blending with Progressive Ratio; Interlacing; Alpha Blending & Interlacing.

Figure 11:
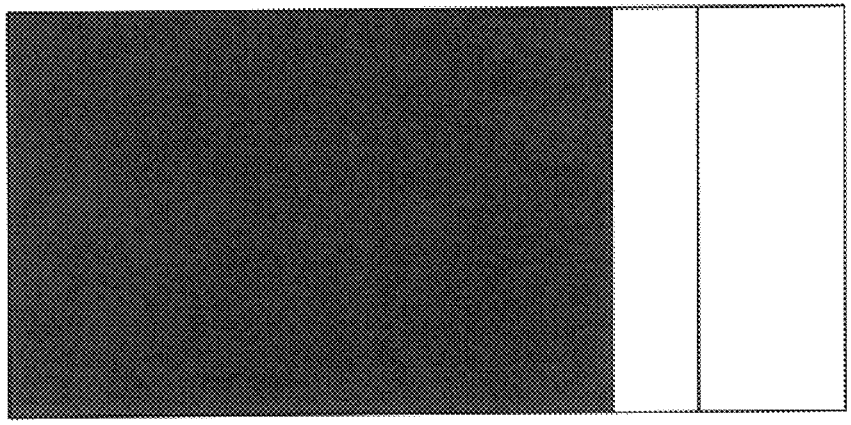
FIG. 11 is an illustration of alpha blending mixing between the preview strip and the Current View, according to the present invention.

The alpha blending mixing between the preview strip and the Current View is illustrated in FIG. 11. The preview strip is alpha-blended with the overlap part of the real-time Current View and displayed. The alpha-blending operation is done with the following algorithm:

Result=alpha×Preview_Strip+(1−alpha)OverlapPart_of_Current_View.

Figure 12:
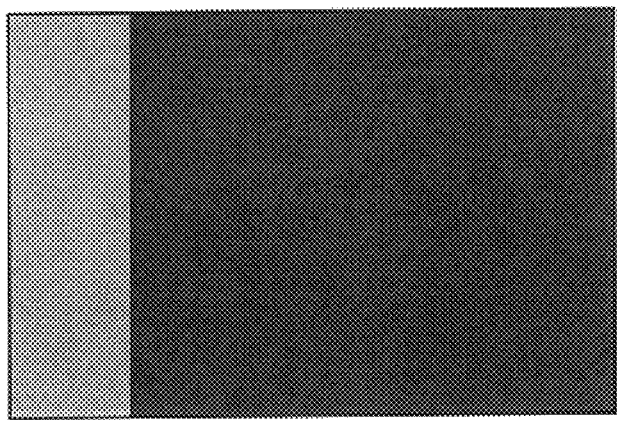
FIG. 12 is an illustration of the results of alpha blending of FIG. 11 with a constant ratio, according to the present invention.
Figure 13:
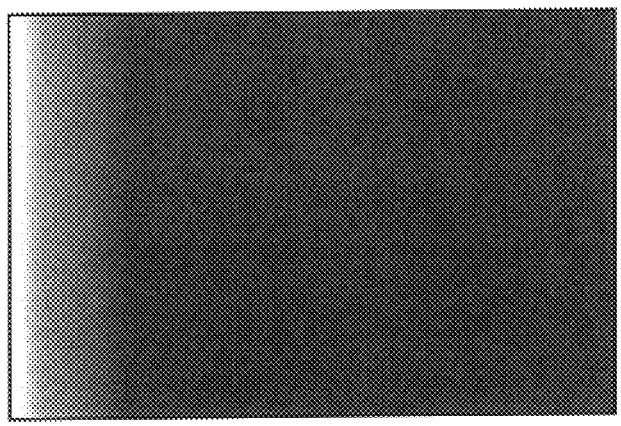
FIG. 13 is an illustration of the results of alpha blending of FIG. 11 with a progressive ratio according to the present invention.

The alpha ratio of the blending can be user selected of fixed. The alpha blending can be uniform over the preview picture or varies over the overlay part as shown in FIG. 11, where the Current View is denoted in black 1102 and the preview strip denoted in white 1104. The result of the constant ration alpha blending in shown in FIG. 12. FIG. 13 is an illustration of the results of alpha blending of FIG. 11 with a progressive ratio according to the present invention. An error in positioning the camera will be immediately noticed on the display as a doubling feature of the viewed scene.

Figure 14:
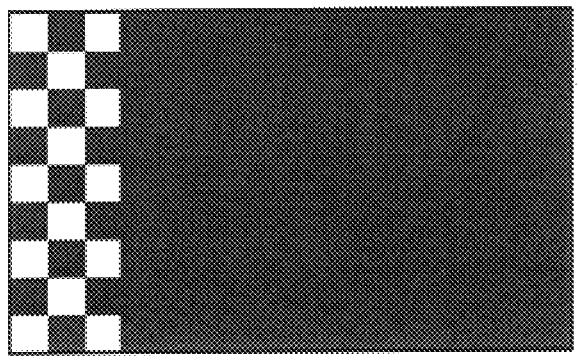
FIG. 14 is an illustration of the results of interlace blending of FIG. 11 using blocks, according to the present invention.
Figure 15:
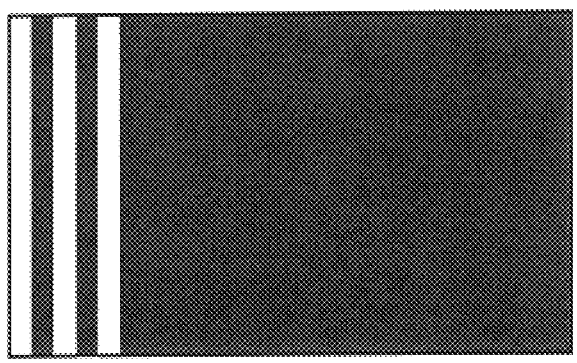
FIG. 15 is an illustration of the results of interlace blending of FIG. 11 using lines, according to the present invention.

Blocks of the preview picture are interlaced with the real-time Current View displayed on the camera. Several block sizes can be used, including blocks as wide as the preview picture (blocks of lines) and blocks as high as the preview picture (blocks of columns). The size of the blocks does not need to be uniform. FIG. 14 is an illustration of the results of interlace blending of FIG. 11 using blocks and FIG. 15 is an illustration of the results of interlace blending of FIG. 11 using lines according to the present invention. An error in positioning the camera will be immediately noticed on the Display as a breaking of features of the viewed scene at the blocks edges.

Figure 16:
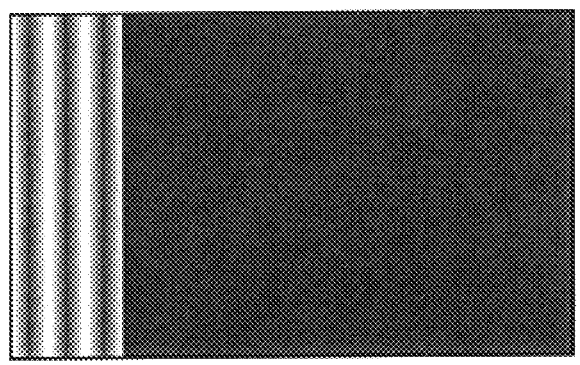
FIG. 16 is an illustration of the results of alpha blending with interlace blending of blocks of FIG. 15, with the vertical dimension equal to the vertical dimension of the picture according to the present invention.
Figure 17:
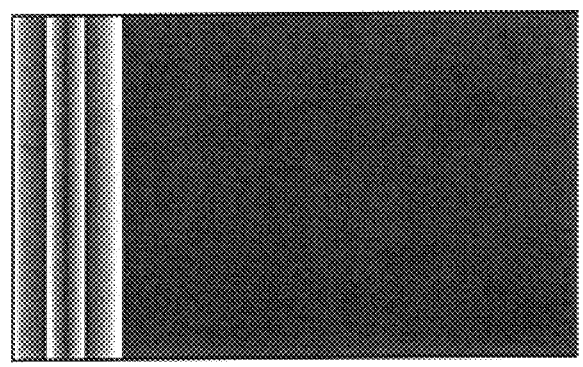
FIG. 17 is an illustration of the results of alpha blending with interlace blending of only some of the blocks of FIG. 15, according to the present invention.

Both alpha Blending and Interlacing can be used as shown FIG. 16, which illustrates the results of alpha blending with interlace blending of blocks of FIG. 15 and FIG. 17 which illustrates the results of alpha blending with interlace blending of only some of the blocks of FIG. 15 according to the present invention. Alpha blending on blocks are illustrated with the vertical dimension equal to the vertical dimension of the picture.

C. Saving the Panorama

Figure 19:
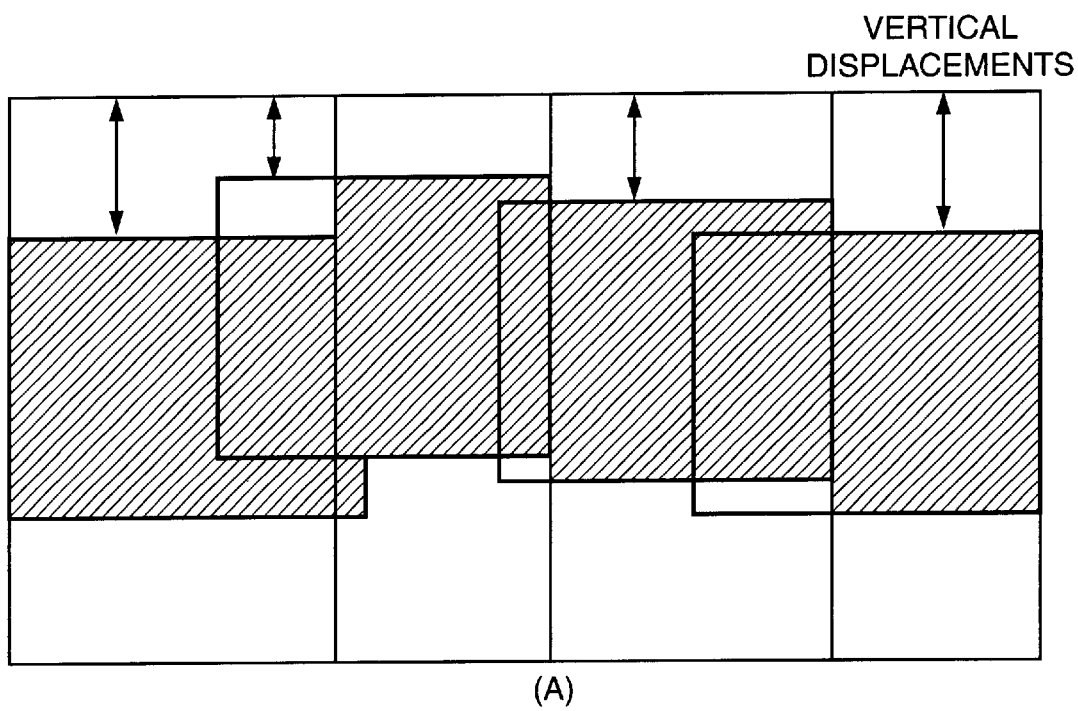
FIG. 19 is an illustration of the individual frame buffers laid out on a panorama, according to the present invention.

FIG. 19 shows the individual frame buffers laid out on a Panorama. The width of the Panorama grows as more frames are acquired. In one embodiment, the height of the Panorama is fixed, and is defined as a function of the height of each individual frame and the maximum vertical displacement. A fixed vertical height enables the calculation of an individual frame, combined with the previous vertical displacement of the previous frames so that if the frame extends beyond the fixed height of the panorama is clipped. In another embodiment, the height of the panorama can be adjusted when the vertical displacement of an individual frame combined with eh vertical displacement of all previous frames is such that the frame extend beyond the current height of the panorama. If the vertical displacement of an individual frame is such that the frame extends beyond the height of the Panorama, the frame is clipped.

Figure 20:
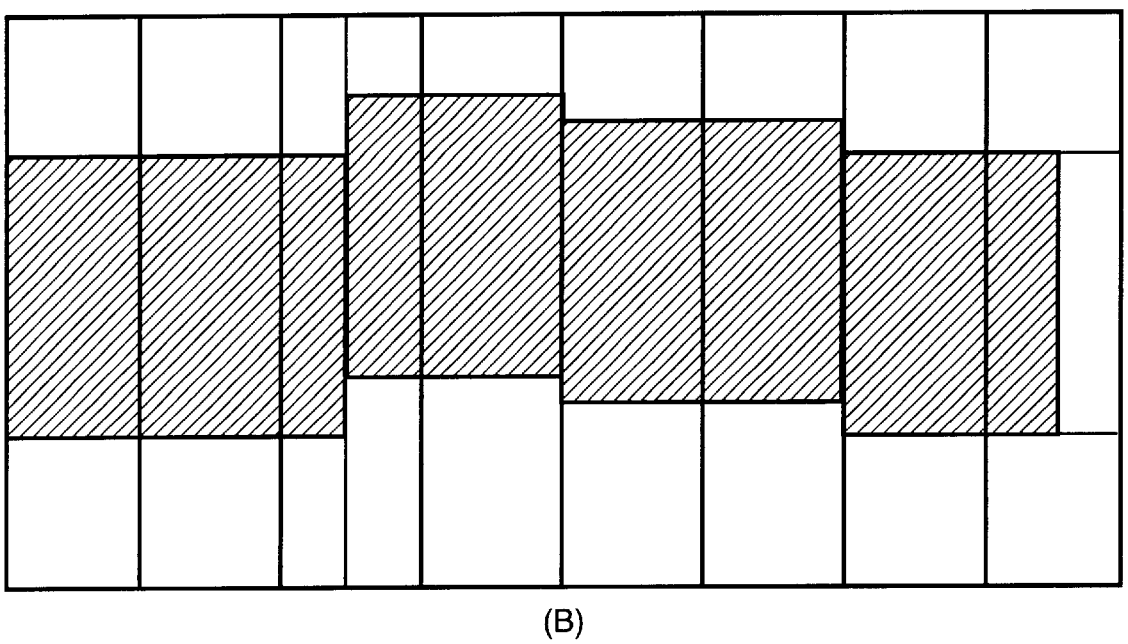
FIG. 20 is an illustration of the panorama of FIG. 19 saved as fixed-sized strips, according to the present invention.

The Panorama is saved in fixed size strips as illustrated in FIG. 20. The use of saving the image as strips helps facilitate the playback of the strip, as described in Section 6 "Motion Play-Back of Still Pictures That Have Been Previously Stored," below. The saving process is managed by a Panorama Saving Module that maintains a working buffer the size of a single strip. Each time a region of prevBuffer 1802 is saved, as many strips as necessary are saved out, and the remainder is stored in the working buffer (to be saved out the next time). After the last curBuffer 1808 is saved, the (partial) working buffer is saved out.

5. DETAILED PICTURE STITCHING DEVICE ARCHITECTURE

Figure 21:
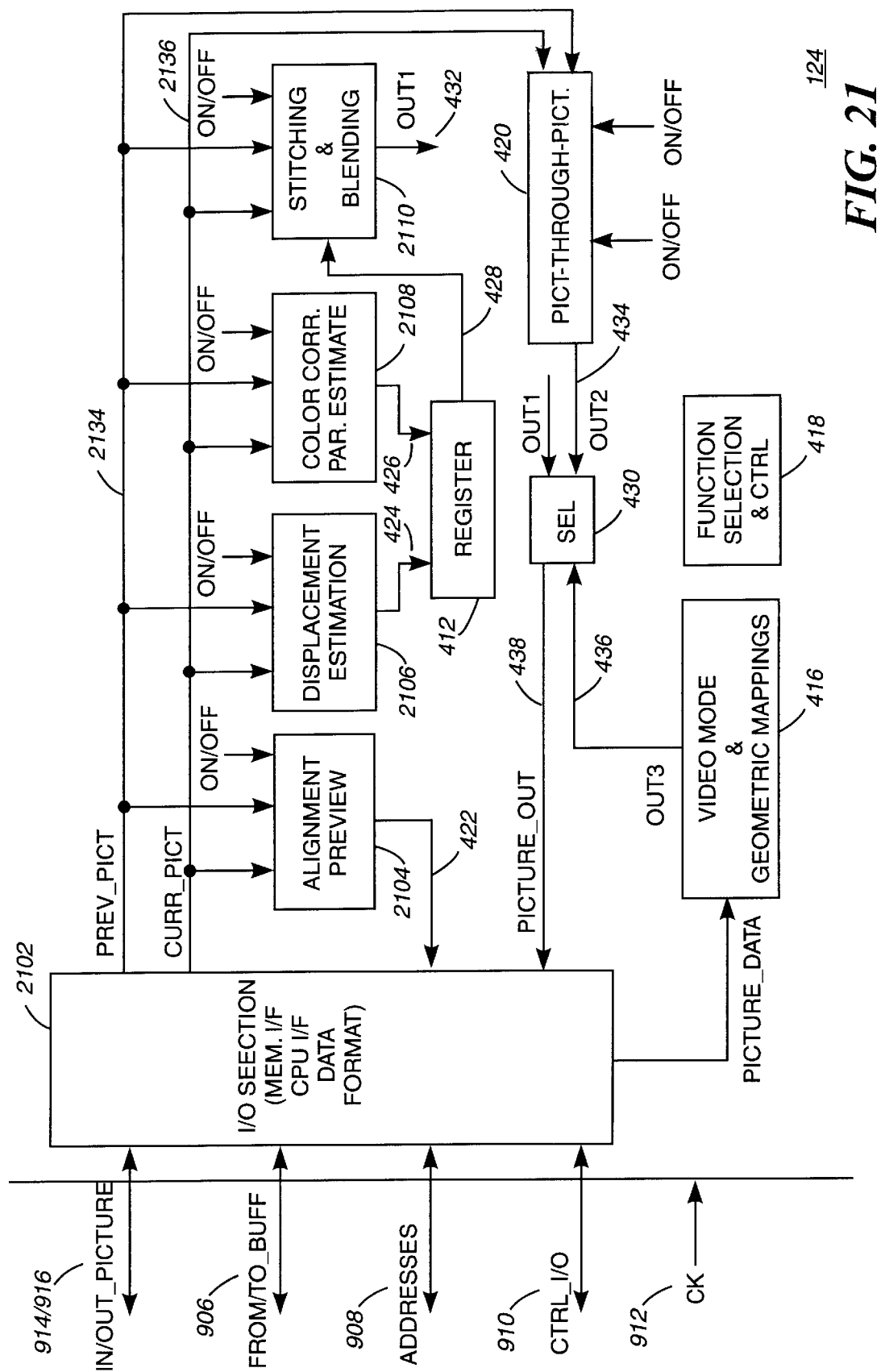
FIG. 21 is a detailed block diagram of the picture stitching device of FIG. 9, according to the present invention.

FIG. 21 is a detailed block diagram 2100 of the picture stitching device 124 of FIG. 19, according to the present invention. The I/O Sections 2102 contains all the Interfaces and data formatting resources able to make the device communicate with the environment. Two lines 2134 and 2136 from Previous Buffer 1902 and Current Buffer 1904 are coupled to the Alignment Preview 2104, Displacement Estimation 2106, Color Correlation Parameters Estimation, Stitching & Blending 2110 and the Picture-through-Picture 2120. The output of the Alignment Preview is fed-back to the I/O Section 2102. The output of the Displacement Estimator 2106 and the Color Correction Estimator 2108 are feed to a Register 2112, which feeds the result into the final Stitching and Blending 2110. The video Mode & Geometric Mapping 2116 receives picture date from I/O Section 2102. The output of the Stitching & Blending 2110 and the Picture-through-Picture 2120 and the Video Mode & Geometric Mappings is feed through Selector 2114 which is controlled by Function Selection and Control 2118. The function selection and control 2118 include on/off controls 2138 to each major section as shown. The architectures of Alignment Preview 2104, Displacement Estimation 2106, Color Correlation Parameter Estimator 2108, and Stitching and Blending 2110 are now described followed by the process implemented by each.

In an alternate embodiment, everything except the minimum circuitry of the picture stitching device 124 to enable alignment preview 2104 can be located on a remote processing device such as a personal computer or other microprocessor-based device. The use of a remote processing device, reduces the size of the electronic circuitry in picture stitching device 124, the weight of the picture stitching device 124 and the complexity and associated cost of manufacturing the picture stitching device 124. In this embodiment, any or all of the following components may be in a remote processing system, including: the displacement estimation 2106, the color correction parameter estimation 2108, and the stitching & blending 2110 can be located or implemented in a remote microprocessor-based system (not shown). The interface to the remote microprocessor-based system may be through the Serial I/O 136 or Storage Media 142 that may be removable and coupled to the remote microprocessor-based system.

A.1. Alignment Preview Architecture

Figure 22:
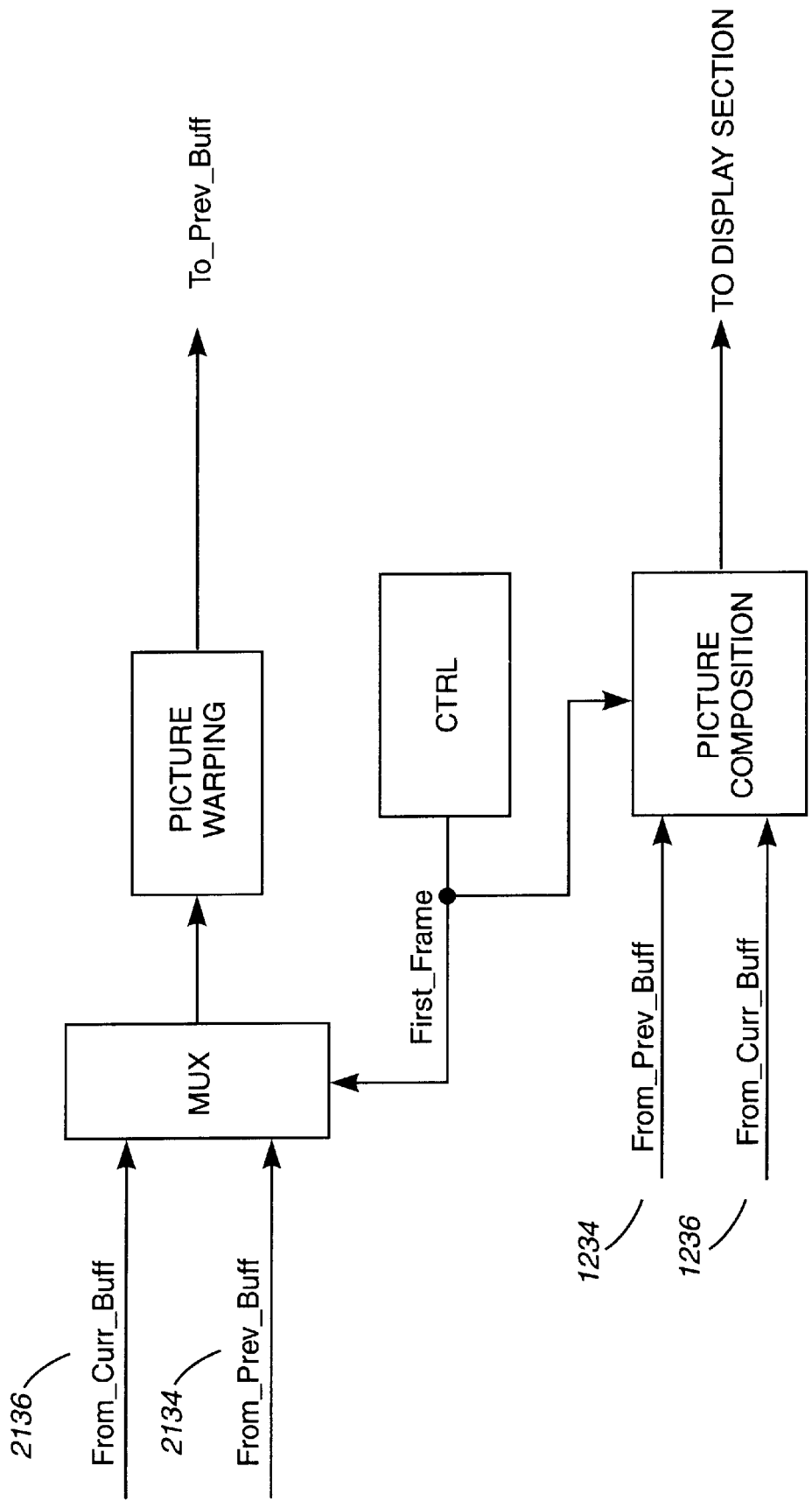
FIG. 22 is a block diagram of the Alignment Preview architecture of FIG. 21, according to the present invention.

FIG. 22 is a block diagram 2200 of the architecture of the Alignment Preview of FIG. 21, according to the present invention. After the Previous Picture and Current Picture have been converted into cylindrical coordinates, the relative displacement between them must be computed.

A.2. Perspective Correction in Alignment Preview

Figure 23:
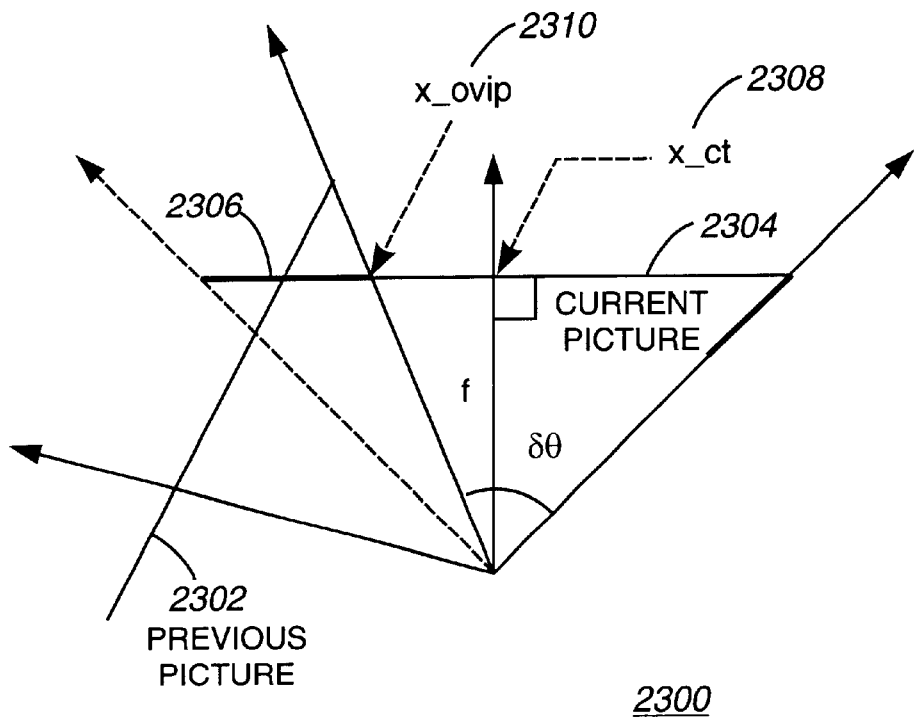
FIG. 23 is an illustration of the capturing of two rectilinear image planes and the relationship to a cylindrical circle of a fixed focal point f, according to the invention.

An overview of the picture stitching device 124 is now described for the region of overlap. FIG. 23 is a top view of the Alignment Preview geometry according to the present invention. A Previous Picture 2302 was captured by digital camera 100 and that f is the focal length of the lens 102 of this camera. This Previous Picture 2302 is stored in the Previous Buffer 902. The digital camera 100 is rotated by an angle $\delta\theta$ so that the Current Picture 2304 is captured with a given overlap region along the x axis with the Previous Picture 2304. The symbol $\delta\theta$ denotes the rotation angle required to produce an overlap of the given width. The symbol x_ovlp 2310 denotes the right edge of the overlay region; x_ctr 2308 denotes the center of the image plane. It is important to note, that in this embodiment, the rotation is horizontal, from left-to-right but the principle applies described herein apply to horizontal right-to-left rotation as well as top-to-bottom or bottom-to-top rotation.

The part of each picture (Previous Picture 2302 and Current Picture 2304 that is also depicted in the other picture is called the overlap region. Although the scene captured in the Previous Picture 2302 and the Current Picture 2304 is the same in the overlap region 2306 because of a difference in perspective. The Alignment Preview 2304, generates a preview of the Current Picture 2304 by correcting the perspective of the overlap region 2306 of the Previous Picture 2302 to conform with the perspective of the Current Picture 2304.

The process of perspective correction during the alignment previous involves the following steps:

(a) Mapping each of the pixels of the Previous Picture 2302 to an X-Y coordinate;

(b) Mapping each of the pixels of the Current Picture 2304 to an X-Y coordinate so that the x-axis is the center of the image plane of the current picture along the direction of the panning motion of the digital camera 100 and so that the y-axis is perpendicular to the x-axis and lies in the same image plane. This is shown graphically in FIG. 23.

(c) Calculating the rotation angle $\delta\theta$ based on the amount of overlap in the preview area along the x direction.

(d) Calculating the rectilinear x-coordinate transformation based on $\delta\theta$ to project or perspectively warp, the Current Picture 2304 onto Previous Picture 2302. This is shown graphically in FIG. 24.

(e) Calculating the y-scanline resealing.

Figure 24:
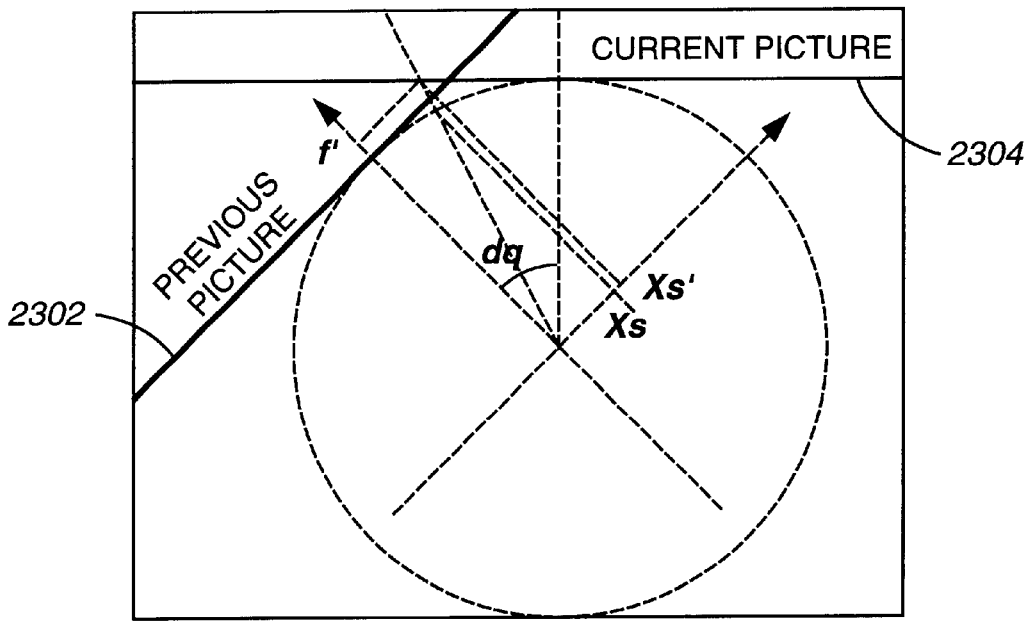
FIG. 24 is an illustration of pixels in the overlap region of the current picture of FIG. 23 being projected back to the Previous Picture of FIG. 23 in the overlap region, according to the present invention.
Figure 25:
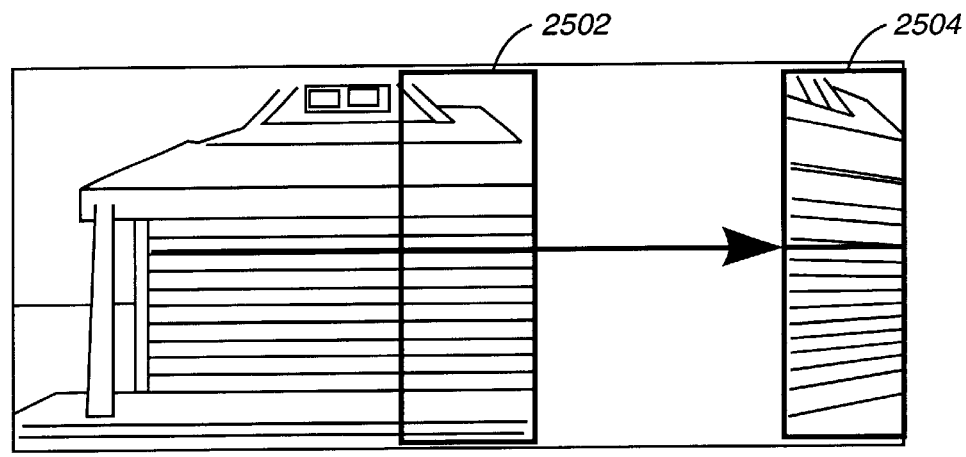
FIG. 25 is an illustration of pixels of the selected overlap region of source picture of FIG. 7 that cannot be perspectively corrected, according to the invention.

Steps c, d, and e above are all now shown mathematically with reference to FIGS. 24 and 25.

FIG. 24 is an illustration 1500 of pixels in the overlap region of the current picture of FIG. 23 being projected back to the Previous Picture of FIG. 23 in the overlap region 2306 according to the present invention. We note x_dst and y_dst the coordinate of the pixels of the Current Picture 2304 and we note x_src' and y_src' the coordinate of the pixels of the Previous Picture 2302.

In this example, the overlap region 2306 of the Current Picture 2304 indicates the overlay region 2306 that is derived from the Previous Frame 2304; in this case, the camera 100 rotating clockwise.

To calculate the rotation angle δθ based on x_ovlp 2310:

$$\delta\theta = \arctan(x\_ctr - x\_ovlp/f) + \arctan(width - x\_ctr/f).$$

The width of this overlap region 2306 is a system parameter. Given the width of the overlap region 2306, the rotation angle required to produce an overlap of that width is calculated. The width of the overlap region is specified by the location of the region's rightmost (innermost) edge x_ovlp 2310.

The transform induced on the Previous Picture as a result of the 3D rotation is a uniform resealing of each vertical scanline independently. (In the case of camera tilt, the transform is a uniform resealing of each horizontal scanline independently). This transform is described by: (a) the location of the source scanline corresponding to each destination scanline; (b) the scale factor for each scanline; and (c) column scaling. Calculating the x-coordinate transformation:

$$x'\_src = (x\_dst \times \cos \delta\theta) + (f \times \sin \delta\theta),$$

$$f'\_src = (-x\_dst \times \sin \delta\theta) = (f \times \cos \delta\theta).$$

Solving for x-src:

$$x\_src = (f \times x'\_src)/f'\_src$$

$$x\_src = f \times ((x\_dst \times \cos \delta\theta) + (f \times \sin \delta\theta))/((-x\_dst \times \sin \delta\theta) + (f \times \cos \delta\theta)) \quad \text{EQ1}$$

The location of the source scanline (x_src) is dependent on the rotation angle (δθ) the focal length (f), and the destination scanline location (x_dst). The equations above describe a 2D plane rotation of the x and f axis; the y axis is left unchanged. The source scanline location (x_src) is calculated by projecting onto the image plane of the Previous Frame. Calculating y-scanline rescaling:

$$y'\_src = y\_dst.$$

$$y\_src = (f \times y'\_src)/f'\_src$$

$$y\_src = y\_dst \times [f/((-x\_dst \times \sin \delta\theta) + (f \times \cos \delta\theta)] \quad \text{EQ2}$$

This equation shows that y_src is a uniform rescaling of y by a factor that depends on x_dst, the rotation angle δθ, and the focal length f. Like x_src, y_src is computed by projecting onto the image plane of the Previous Frame.

Note that there are likely to be instances where the overlap region 2306 of Current Picture 2304 cannot be computed from overlap region 2306 of the Previous Picture 2302, according to the present invention. This is shown as areas 2502 and 2504 of FIG. 25.

It should be understood that all trigonometric calculations can use look-up tables as required for faster implementation. All sections of the picture stitching device 124 use a 'closest' coordinate approach when the result of a coordinate computation is not integers. Another approach is to read the value of the neighboring pixels and perform an interpolation. The location of the source scanline (x_src) is calculated based on the rotation angle (δθ), the focal length (f), and the destination scanline location (x_dst). The principle is that, for any given column x_dst of the Preview Area 602, the location in the Previous Buffer 902 is computed based on the corresponding x_src column. The given column x_dst the scaling factor:

$$f/((-x\_dst \times \sin \delta\theta) + (f \times \cos \delta\theta)) \quad \text{EQ3}$$

The column scaling is performed by reading a column from the Previous Buffer 902 and write a scaled version of this column in the Current Buffer 904.

A.3. Fast Buffering During Perspective Correction

Figure 26:
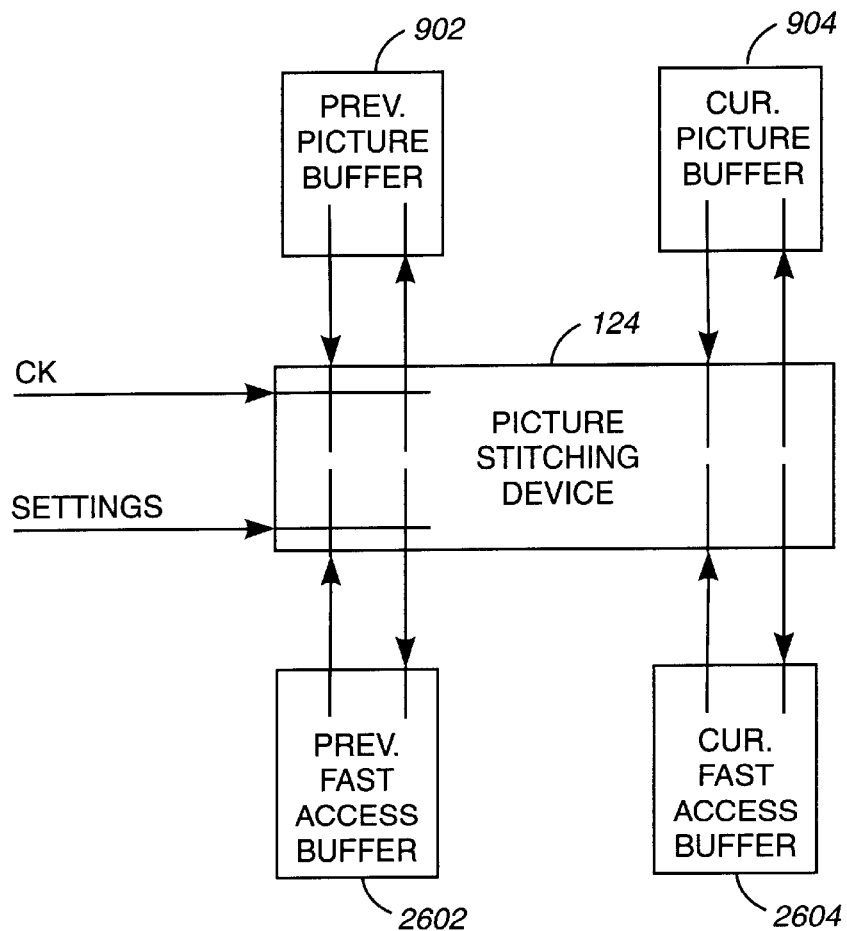
FIG. 26 is a block diagram of an alternate embodiment of FIG. 9 with two optional blocks used to improve the perspective correction algorithm performance, according to the present invention.
Figure 27:
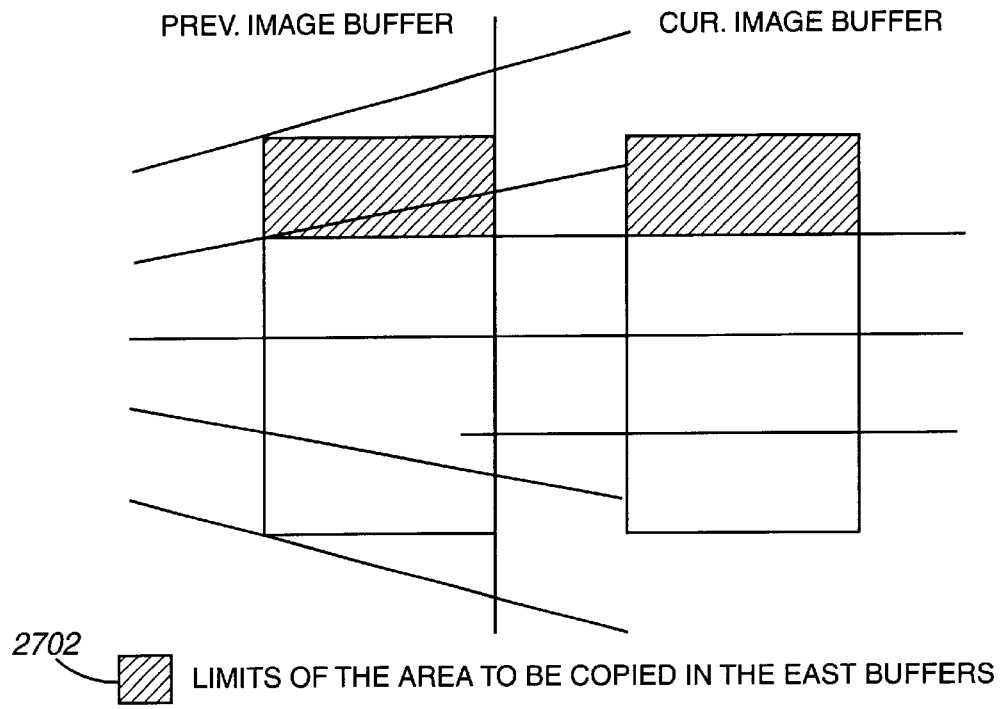
FIG. 27 is an example of a limit area copy from a Previous Buffer to a Current Buffer of FIG. 26 during a first pass, according to the present invention.

Turning now to FIG. 26, shown is block diagram 2600 of an alternate embodiment of FIG. 9 with two optional blocks 2602 and 2604 used to improve the perspective correction algorithm performance, according to the present invention. A buffer copy section copies a block of memory from the Previous Buffer 902 to the Previous Access Buffer 2602. For a given Previous Fast Access Buffer size, the size of the Previous Buffer 902 part than can be buffered depends on the rotation angle (δθ), which depends on the desired size of the overlap area 2306 and of the focal length f FIGS. 27–30 illustrate an example where the complete Previous Buffer 902 and Current Buffer 904 are copied in four passes. The coordinate of the area to be buffered in the Current Buffer 904, the coordinate of the corresponding points in the Previous Buffer 902 (given by equations EQ. 1 and EQ. 2 above) and the limits of the area to be buffered in the Previous Buffer 902 are represented.

Figure 28:
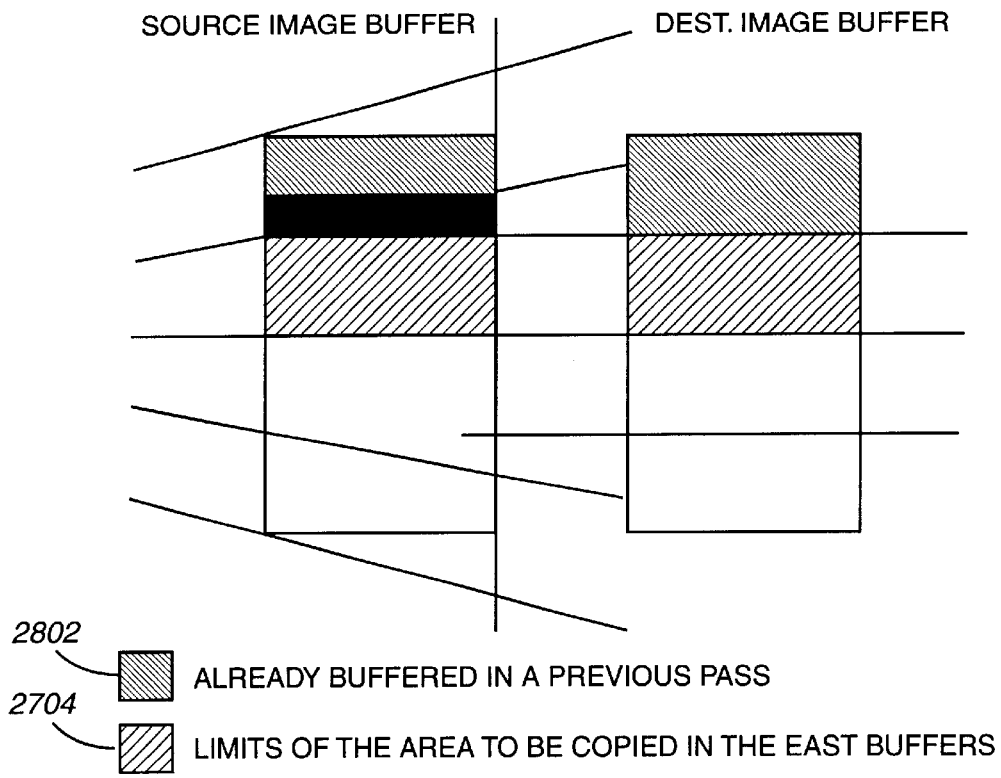
FIG. 28 is an example of a limit area copy from a Previous Buffer to a Current Buffer of FIG. 26 during a second pass, according to the present invention.
Figure 29:
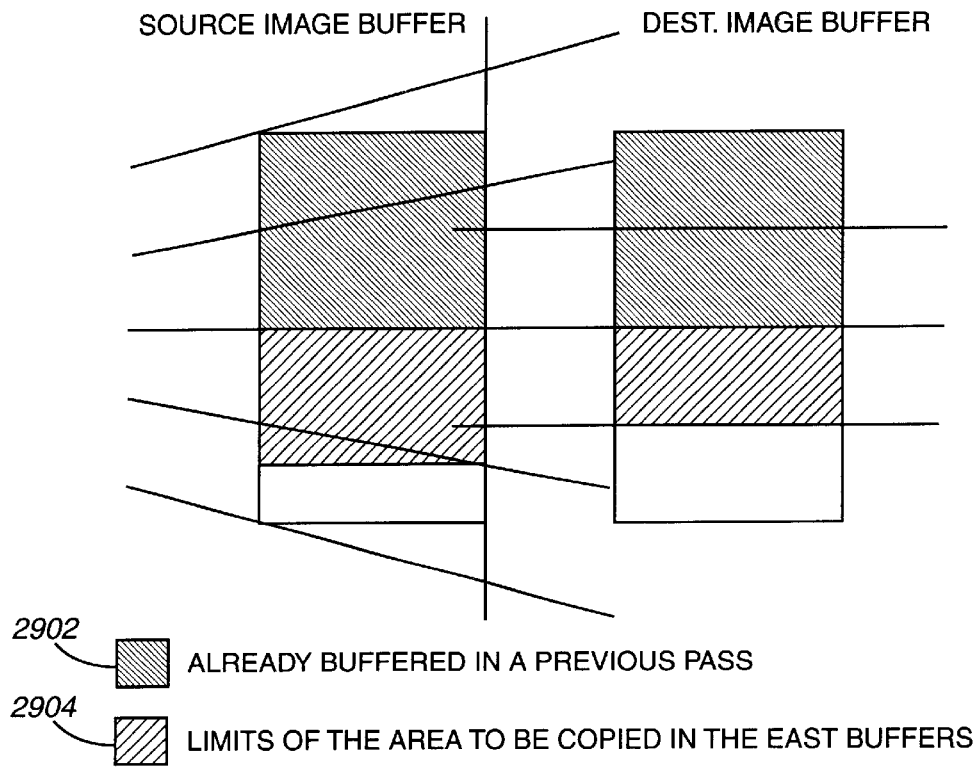
FIG. 29 is an example of a limit area copy from a Previous Buffer to a Current Buffer of FIG. 26 during a third pass, according to the present invention.
Figure 30:
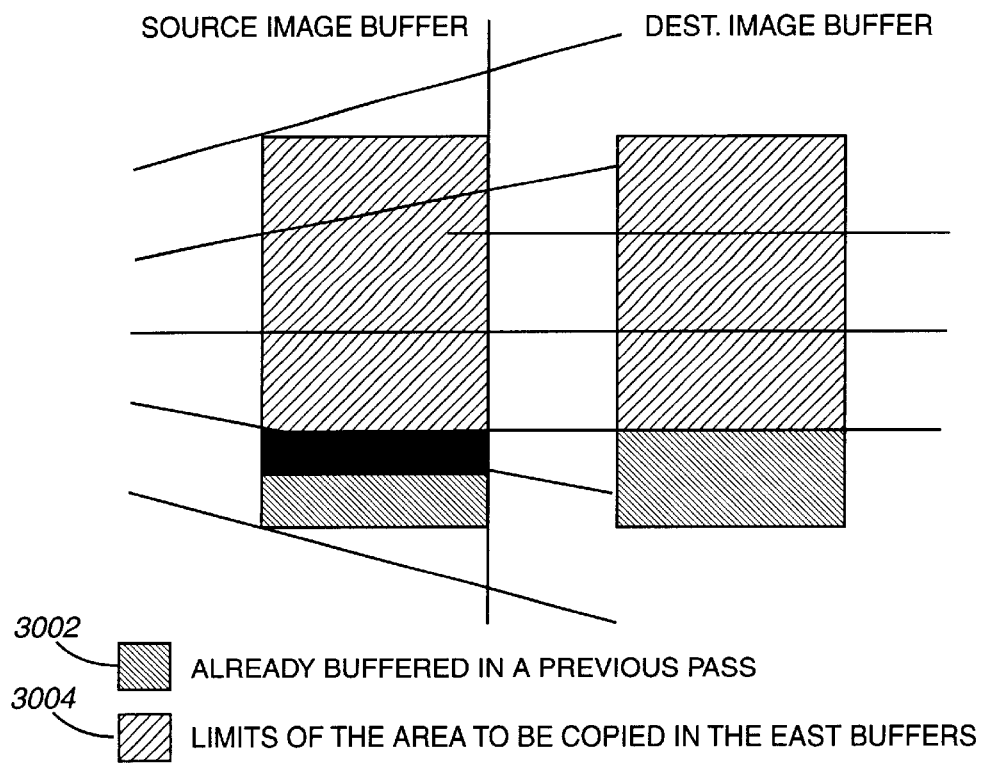
FIG. 30 is an example of a limit area copy from a Previous Buffer to a Current Buffer of FIG. 26 during a fourth pass, according to the present invention.
Figure 31:
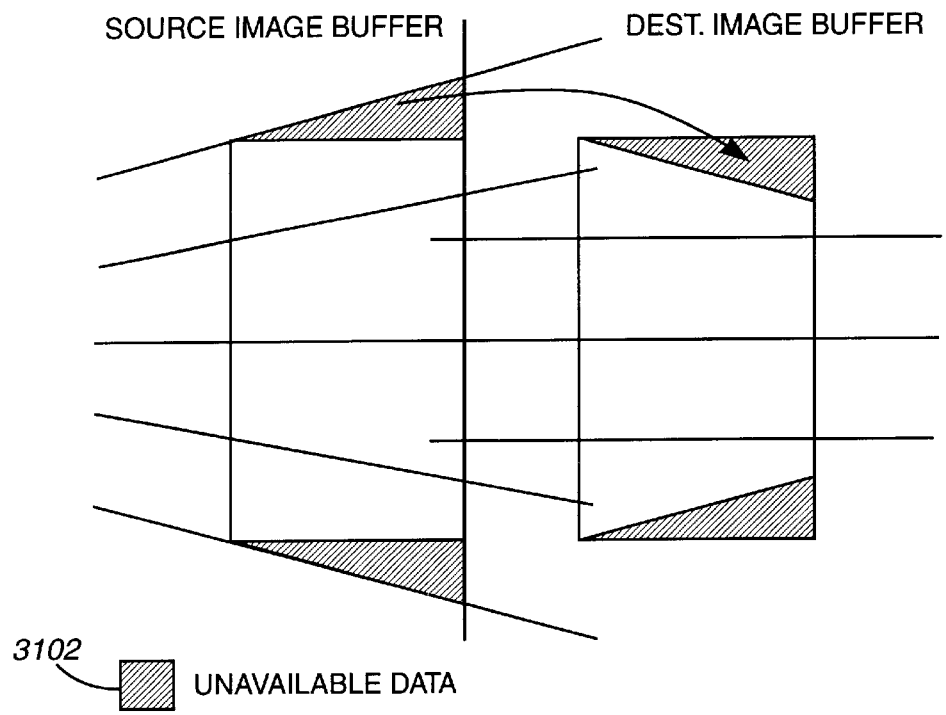
FIG. 31 is an example of areas of Current Buffer for which there is no information, according to the present invention.

FIGS. 27–31 illustrates an example of a limit copy area 2702 from a Previous Buffer 902 to a Current Buffer 904 of FIG. 26 during four passes according to the present invention. In FIG. 28 which illustrates pass two, note that the areas to be buffered in the Previous Buffer 902 overlap between two successive passes. Also note that some points of the Current Buffer 904 have no corresponding points in the Previous Buffer 902 as they fall outside the picture area. This results in area of the Current Buffer 904 for which there is no information. This is illustrated in FIG. 31 as area 3102.

B.1. Algorithm for Rectilinear-to-Cylindrical Transform (Cylindrical WARP in Place)

Figure 32:
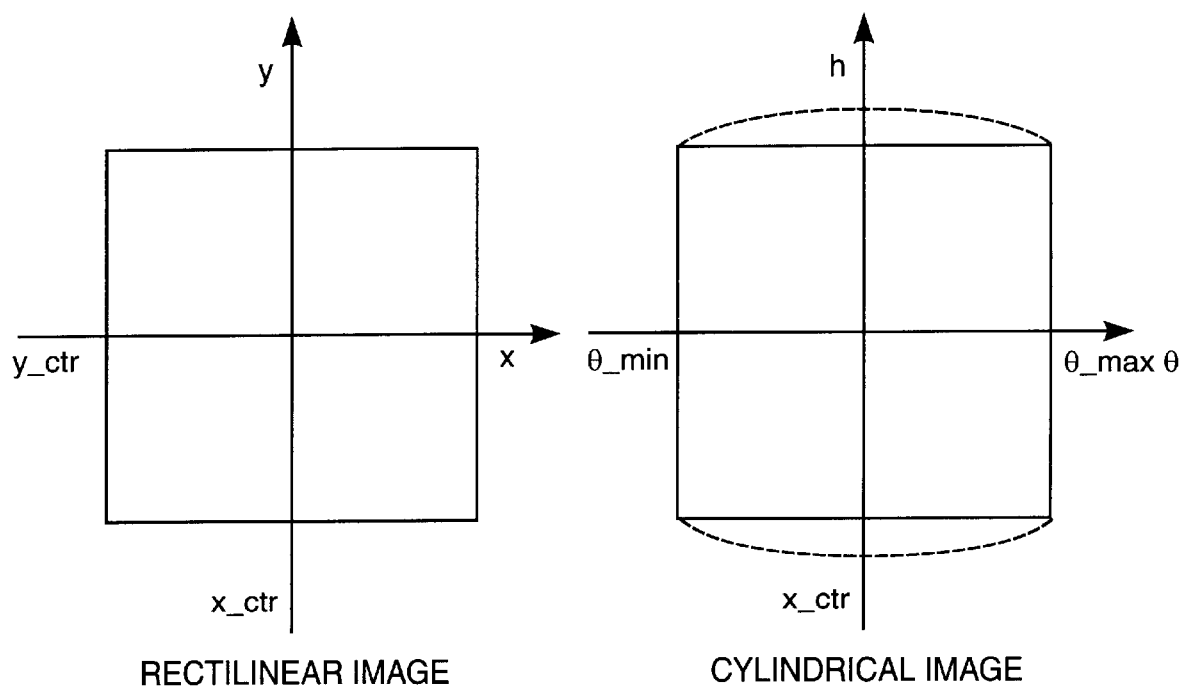
FIG. 32 is an illustration of rectilinear and cylindrical images, according to the present invention.

FIG. 32 is an illustration of rectilinear and cylindrical images. A rectilinear image is parameterized by its optical center (x_ctr, y_ctr) and its focal length (f). The coordinates of a cylindrical image are the height of the cylinder (h) and the angular distance (θ). The Rectilinear to Cylindrical Transform transforms a rectilinear image (an image acquired with optics that can be approximated by a model pin-hole camera) into cylindrical coordinates. The specific algorithm outlined below performs the transformation in-place with the use of a small buffer. It also automatically crops the result as shown in the right half of FIG. 32. Like the Overlay Generator, the Rectilinear to Cylindrical Transform uniformly rescales each vertical scanline in the image independently. Thus, the transform is described by: (a) the location of the source scanline corresponding to each destination scanline, and (b) the scale factor for each scanline.

Figure 33:
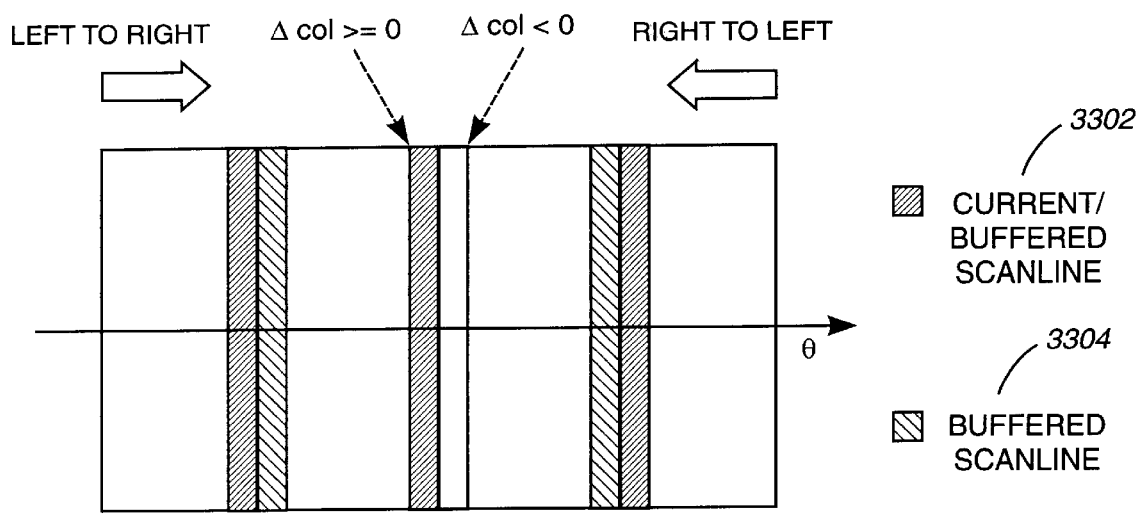
FIG. 33 is a schematic showing the two phases of the in-place rectilinear to cylindrical transformation process, according to the present invention.
Figure 35:
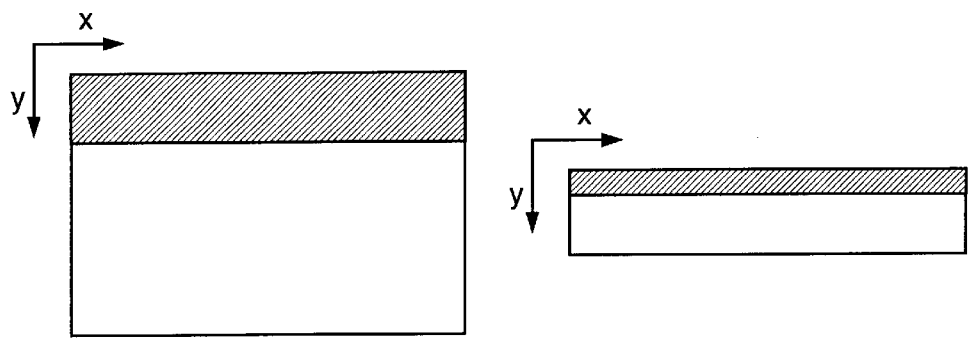
FIG. 35 is an illustration of vertical and horizontal down-sampling of an image, according to the present invention.
Figure 35:
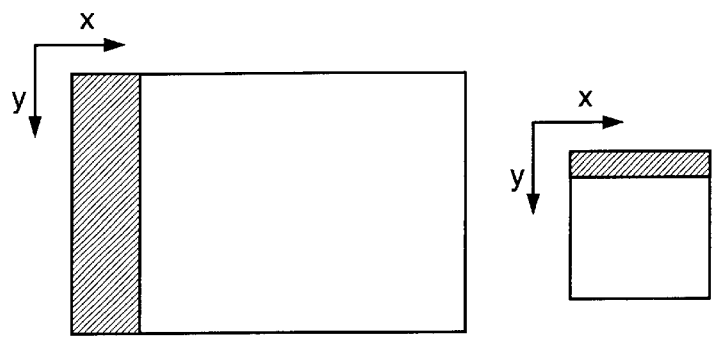

FIG. 33 is an illustration of the two phases of the in-place rectilinear to cylindrical transformation process. The left-to-right phase ends with the last column being the column just before the first column corresponding to Δ col<0; the right-to-left phase ends with that column. The in-place implementation of the Rectilinear to Cylindrical Transformation comprises two passes (which could be implemented in parallel). The first pass is the left-to-right pass which begins with the leftmost column and ends just before the first column corresponding to Δ col<0. Before proceeding with either passes, the vertical scanline corresponding to the last column of the left-to-right pass is buffered.

During the left-to-right pass, each new destination vertical scanline is computed by resealing a scanline somewhere to the right of it (or even at the same location). Since the image representation of the current implementation could be subsampled horizontally, a buffer of two column of pixels, the current scanline and the next (right), is needed. When using a YcrCb format for the pictures were Chroma samples (Cr: Chroma red and Cb: Chroma blue) are decimated. This is because the original subsampled chroma samples could be required after they have been modified (rescaled). Each Chroma sample is shared between two successive Luma (Y) samples. At the end of each iteration of the pass, the buffers are updated. If the source vertical scanline is either the current or the next scanline, the buffered copies are used instead of being derived from the Current Picture.

In another embodiment, interpolation is used to create a column of source pixel (in the case when the computed source column coordinate does not correspond exactly to a real source column coordinate, the closest real source column is used. The use of the closest real source column is an approximate solution that yields average picture quality. To perform interpolation, several source columns are used so a few columns are buffered for later interpolation.

The right-to-left pass proceeds analogously, the only difference is that the source scanlines are computed by rescaling scanlines somewhere to the left of current scanlines. A similar two-scanline buffer that contains the current and the next (left) is also required. The last (leftmost) scanline could require the scanline to the left of it. If so, the copy buffered at the start should be used in place of the Current Picture.

B.2. Calculating the X-coordinate Transformation

The location of each source vertical scanline (x_src) depends on the destination scanline ($\theta$) and the focal length (f). The coordinate $\theta$ varies linearly from $\theta\_min$ to $\theta\_max$ as shown in the following equations.

Where x_src=the coordinate of a column in the source picture $\theta$=the Angle coordinate of a column in the transformed picture The transformation relation:

$$x\_src = f \times \tan(\theta)$$

where f is the focal length used to capture the source picture.

x_src varies from $-w/2$ to $w/2$, and is equal to 0 at the center of the picture. $\theta$ varies from $\theta\_min$ to $\theta\_max$ and is equal to 0 at the center of the picture. Note that $\theta\_max = f \times \tan(w/2) = -\theta\_min$ For storage purpose, a column equivalent is defined to the angle coordinate and define x_dst is defined such that:

$$x\_dst = \theta \times f \times \tan(\theta\_max)/\theta\_max$$

This definition of x_dst ensure the following desirable property:

| | |
|---|---|
| for $\theta = 0$, | x_dst = 0; |
| for $\theta = \theta\_max$, | x_dst = f × tan($\theta\_max$) = w/2 |
| for $\theta = \theta\_min$, | x_dst = f × tan($\theta\_min$) = $-w/2$ | i.e. x_dst is centered on the center of the destination scan line and varies from $-w/2$ to $w/2$, just like x_src.

Using this definition it follows that:

$$x\_src = f \times \tan(\theta) = f \times \tan((x\_dst/f) \times (\theta\_max/\tan(\theta\_max)))$$

to simplify, this can be written $$x\_src = f \times \tan(\theta) \times x\_dst), \text{ where } f \text{ and } C \text{ are constants}$$

By studying the function x_src(x_dst), it is follows that:

| | |
|---|---|
| * for any x_dst between 0 and w/2, | x_dst >= x_src(x_dst) >= 0 |
| * for any x_dst between $-w/2$ and 0, | 0 >= x_src(x_dst) >= x_dst |

Returning to the in place transformation, in order to avoid 'gaps' or overwriting in the destination image, for each column (i.e. for each x_dst) of the destination scanline, we find the closest corresponding column (i.e. x_src) in the source image.

It has been show that:

for any x_dst between 0 and w/2, x_dst>=x_src(x_dst)>=0

This means that, for every x_dst, the information required is located in the source image at column coordinate x_src, which is smaller or equal to x_dst, never bigger than x_dst. In turn, this means that, for any given x_dst, the area of the SOURCE image situated for column coordinate bigger than x_dst is not needed.

By scanning the destination image between 0 and w/2 in decreasing order (i.e. starting at w/2 and finishing at 0).

at time t1, compute x_dst1 using x_src1<=x_dst1 at time t2>t1, compute x_dst2 using x_src2<=x_dst2 and x_dst2<x_dst1 since the scan is progressing in decreasing order.

Therefore, it follows:

$$x\_src2 < x\_dst1$$

All the information of the source image situated at column coordinate bigger than x_dst, is deleted, since it will not be needed for the creation of the current x_dst column of the destination image nor for the creation of any column later in the processing.

Given proper care, the discarded area of the source image can be used to store the destination image itself in order to save the cost of a separate buffer.

When doing the overwriting of the source image by the destination image, some special care must be taken, in particular:

since the function x_src(x_dst) will most of the time not return an integer value, other methods may be used to find the closest source column matching x_src. For example, interpolating a source column based on adjacent source columns, a small number of source columns around x_dst should be buffered and not overwritten as long as they can be necessary in the computation.

when using a Y,Cr,Cb format (in which Cr and Cb samples are decimated, i.e.: shared between several Y sample columns) for the source image, proper buffering of Y columns must be done around x_dst in order not to loose relevant information.

In the region between $-w/2$ and 0, the same reasoning apply if, between $-w/2$ and 0, the destination image is scanned in increasing order (i.e. starting at $-w/2$ and finishing at 0). So, to perform the in place cylindrical transformation, it is necessary to split the picture processing in two part, one from $-w/2$ to 0 and the other one from w/2 to 0. Again, some special care (buffering of a few columns around x_dst) must be taken around x_dst=0.

Although only a small number of columns must be buffered and the size of these buffers is small compared to the size of a complete image buffer. This means that using in place transform save an appreciable amount of memory, and the benefits are proportional to the size of the images used.

B.3. Calculating Y-scanline Rescaling $$y\_src = y\_scale \times y\_dst$$

$$y'\_scale = f/\sqrt{\tan^2\theta + 1}$$

$$y'\_scale\_min = \min(f/\sqrt{\tan^2\theta\_min + 1}, f/\sqrt{\tan^2\theta\_max + 1})$$

$$y\_scale = y'\_scanline/y'\_scale\_min$$

This equation shows that the destination vertical scanline is a uniform rescaling of the source scanline whose scale factor depends on the focal length (f) and the horizontal coordinate ($\theta$). The scale factor is normalized such that the scale factor corresponds to unity at either the left ($\theta\_min$) or the right edge ($\theta\_max$).

C. 1. Algorithm for Displacement Estimation (Motion Estimation)

Motion estimation is performed on a pair of images in cylindrical coordinates. Motion estimation is carried out in four steps:

(1) Horizontal and Vertical Downsampling;
(2) One-Dimensional High Pass Filtering;
(3) Computation of Displacement of Dominant Direction; and
(4) Computation of Displacement in Other Direction.

During the first step, each image is horizontally and vertically downsampled. Since two images are being downsampled, a total of four downsampled images are generated. Each of the four downsampled images is then high pass filtered in the horizontal direction. After high pass filtering, the displacement in the dominant direction is estimated using the appropriate pair of downsampled images. For example, if the horizontal displacements are thought to be larger than the vertical displacements within their respective ranges, then the horizontal displacement is estimated first using the vertically downsampled images. Note it is impossible to be sure if the horizontal displacement are larger since the displacements have not been calculated yet, however in a horizontal panorama, the horizontal displacement are naturally larger than the vertical displacement because it is easy to keep the camera more or less level while it is more difficult to make a mistake on the horizontal positioning of the camera for each shot. At this point, in one embodiment, the assumption is that the vertical displacement is zero. This is possible because (a) the vertical displacement is assumed to be small, and (b) the horizontal displacement estimation is carried out on vertically downsampled images. After the horizontal displacement is obtained, the vertical displacement is estimated using the horizontally downsampled images. In this case, we take into consideration the previously estimated horizontal displacement by translating the horizontally downsampled images appropriately.

a. Horizontal and Vertical Downsampling

Figure 34:
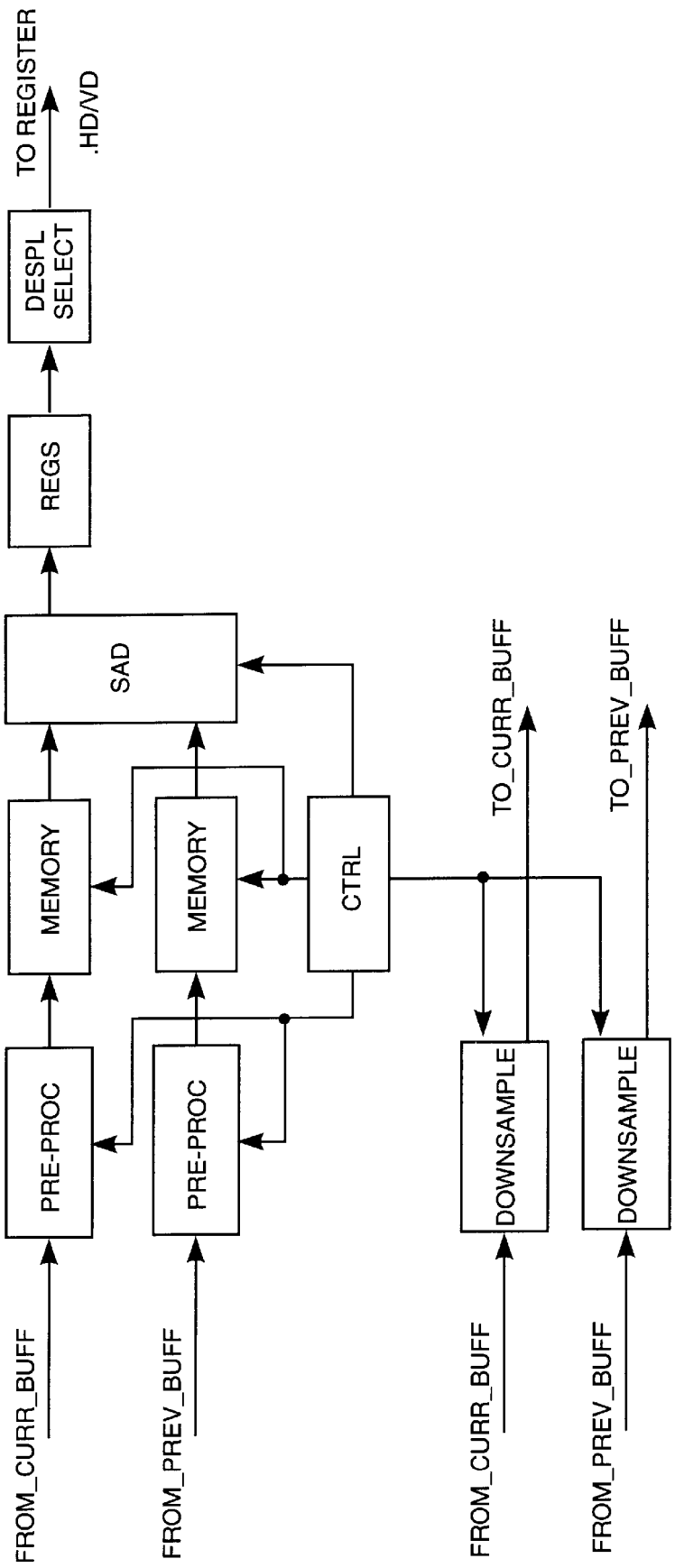
FIG. 34 is a block diagram of the Displacement Estimation architecture of FIG. 21 according to the present invention.

FIG. 34 is a block diagram of the Displacement Estimation architecture of FIG. 21, according to the present invention. The horizontal downsampled result is also automatically mirror reflected so that a vertical displacement of the original image is equivalent to a horizontal displacement of the mirror reflected, horizontally downsampled image. During Horizontal and Vertical Downsampling, multiple vertical scanlines and multiple horizontal scanlines respectively, are (block) averaged. During Horizontal Downsampling, the low-pass result is also reflected about y=x; that is, each downsampled vertical scanline is stored as a horizontal scanline. This is done so that the same one-dimensional High Pass Filtering and one-dimensional Displacement Computation algorithm could be used. Both images are downsampled in the same way; this step could be done in parallel. The output of this block 3400 is the displacement along the horizontal and vertical direction of the two pictures. This results are stored into the Register 512. The Register 512 is a memory element.

b. One-Dimensional High-Pass Filtering

One-Dimensional High Pass Filtering is performed next on each of the downsampled images (a total of four: two per image). This high pass filtering is needed to make the error measure robust (invariant) to global illumination changes. One-dimensional high pass filtering is carried out in the horizontal direction only. Since the horizontally downsampled result has been mirror reflected, one-dimensional high pass filtering in the horizontal direction is the same as filtering in the vertical direction of the unreflected result. The current choice of filter coefficients is [−1, 2, −1].

c. Estimating the Horizontal and Vertical Displacements

The motion estimation required for the digital camera 100 is larger in one direction than the other. When the Panorama is horizontal, the horizontal displacement is assumed to be larger than the displacement in the vertical direction. Conversely, when the Panorama is vertical, the vertical displacement is assumed to be larger than the displacement in the horizontal direction. Thus, and because of the downsampling, we can first compute the displacement in the dominant direction, assuming that the displacement in the other direction is zero. After this displacement is determined, the displacement in the minor direction is computed taking into consideration the displacement in the dominant direction. Nevertheless, displacements are always calculated in the horizontal direction because of the prior rotation of the horizontally downsampled scanlines.

C.2. Calculating the SAD Between Images

Figure 36:
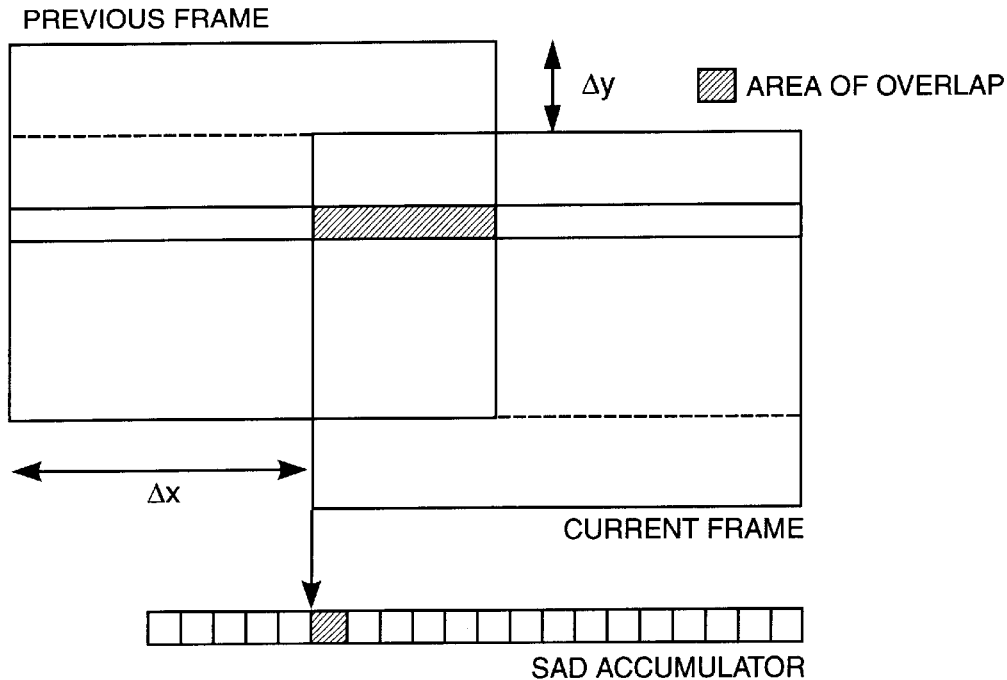
FIG. 36 is an illustration of the sum-of-absolute differences (SAD) between a pair of images according to the present invention.

FIG. 36 is an illustration of the computation of the sum-of-absolute differences (SAD) between a pair of images. The global SAD is computed by accumulating the local SAD between corresponding pairs of scanlines, over all scanlines. In order to determine the optimum horizontal displacement between two images, the sum-of-absolute differences (SAD) between the pair of images is computed at every possible displacement within the search range. Instead of computing the global SAD between two images repeatedly, the local SAD (the SAD between corresponding pairs of scanlines) is computed for each pair of scanline and accumulated in the SAD Accumulator as illustrated in FIG. 36. This allows the images to be accessed once. The pseudo-code for the operation is shown below.

For each displacement dx:
SAD[dx]=0.
For each scanline y:
For each displacement dx:
SAD[dx]+=ScanlineSAD( dx, Image1Scanline, Image2Scanline).

Note that the ScanlineSAD function computes the SAD between pairs of scanline only over the overlap region. Since the overlap region is of varying size, the scanline SAD is also normalized; specifically, the SAD/pixel is computed. Alternatively, if the window over which the SAD is computed by ScanlineSAD is held fixed, then normalization is unnecessary. Note that the ScanlineSAD for all the displacements within the search range could be computed in parallel.

Although SAD is shown, it is important to note that other methods exists to estimate the difference between the two pairs of images. For example, correlation is another method, although more computationally intensive, that can be used in place of SAD. Still other methods exists to accomplish the same results as SAD know to those of average skill in the art.

C.3. Determining the Optimal Displacement

Figure 37:
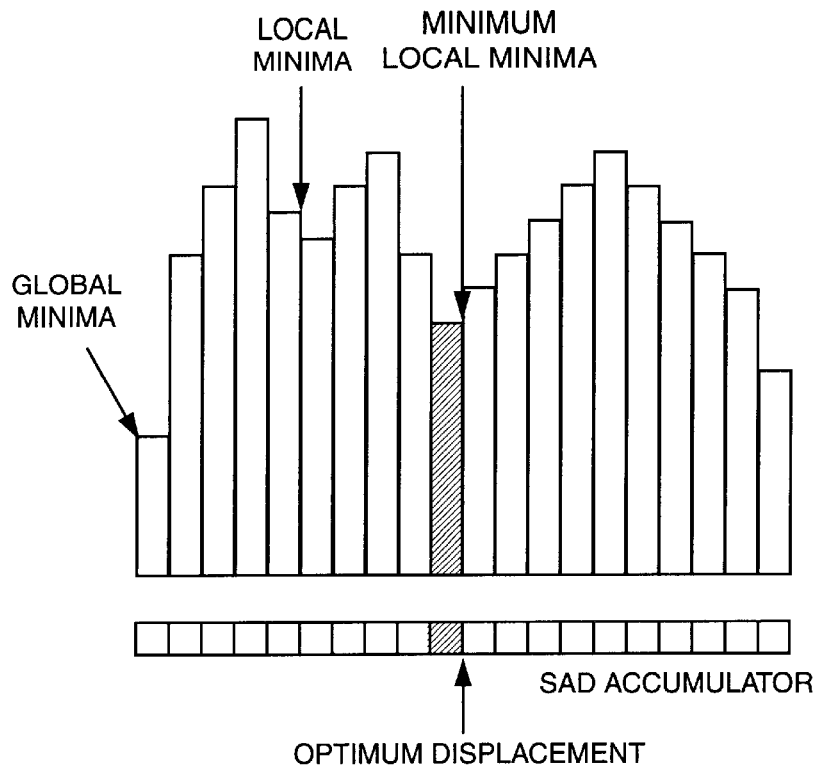
FIG. 37 is an illustration for determining the optimum displacement corresponding to the minimum local minima in the profile, according to the present invention.

FIG. 37 is an illustration of the SAD (error) profile. The optimum displacement is the displacement corresponding to the minimum local minima in the profile. After the SAD between images has been computed, the SAD accumulator is searched for the minimum local minima. The displacement corresponding to this local minima is the optimum displacement. Note that the minimum locall minima is used rather than the local minima. In effect, this excludes the minima that could be found on the boundary of the search range as these would not correspond to the artifacts produced of the local search method.

The required operations are implemented by the Displacement Estimation block depicted in FIG. 34.

If the pictures have to be stitched along the horizontal direction, then the displacement along this direction (the dominant one) is computed. The vertical estimation will be computed as a second step. On the other hand, if the dominant direction is the vertical one, then the displacement along this direction will be computed first. The assumption in this embodiment is that the dominant direction is the horizontal one, however it is important to point out again that all the teachings in the current invention apply to vertical panorama image capturing as well. The downsample blocks compute the two sub-sampled pictures along the vertical direction and store the result in the respective buffers. Then these pictures are pre-processed (for ex. an high pass filter is applied to them) and the Sum of the absolute differences is computed. Further details on this algorithm are described in the section below entitled Algorithm for Image Compositing.

D.1. Color Correction Architecture

Figure 38:
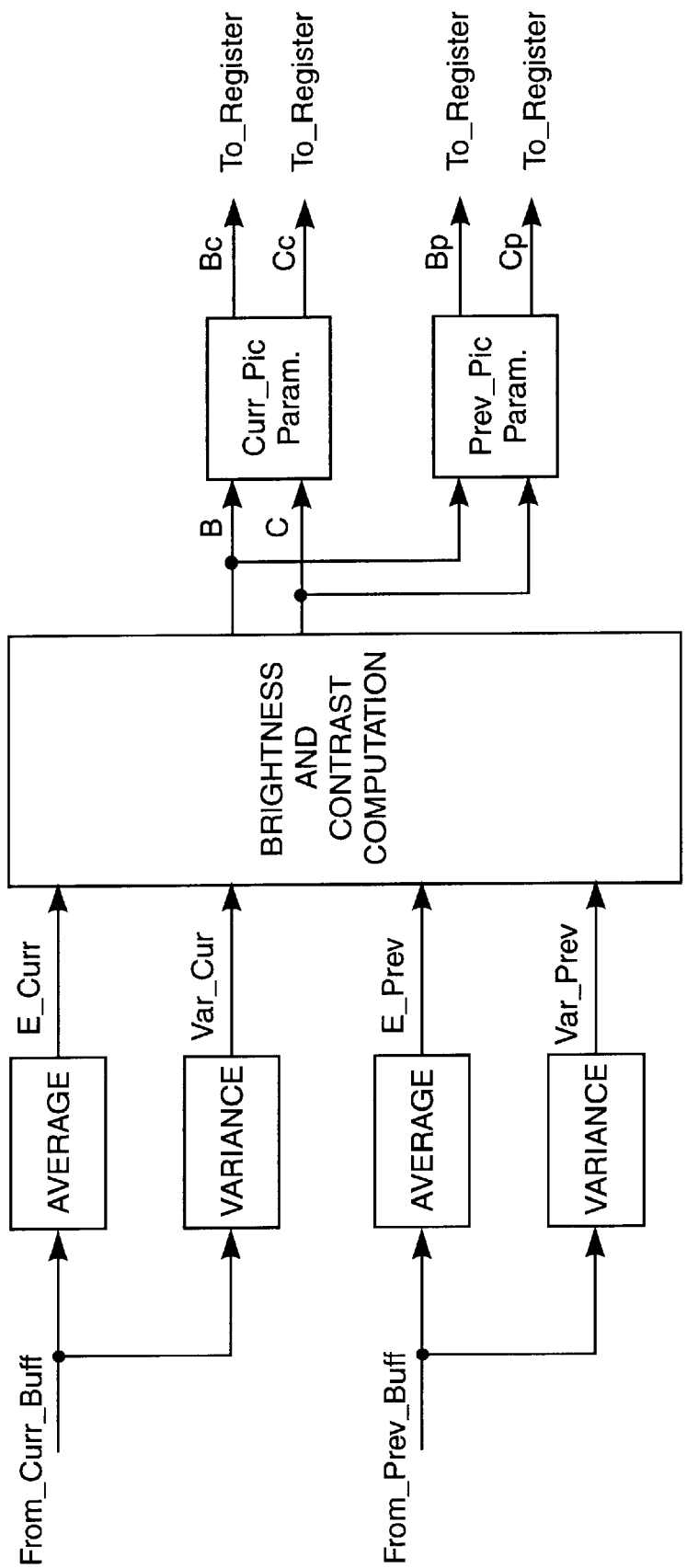
FIG. 38 is a block diagram of the Color Correction architecture of FIG. 21 according to the present invention.
Figure 39:
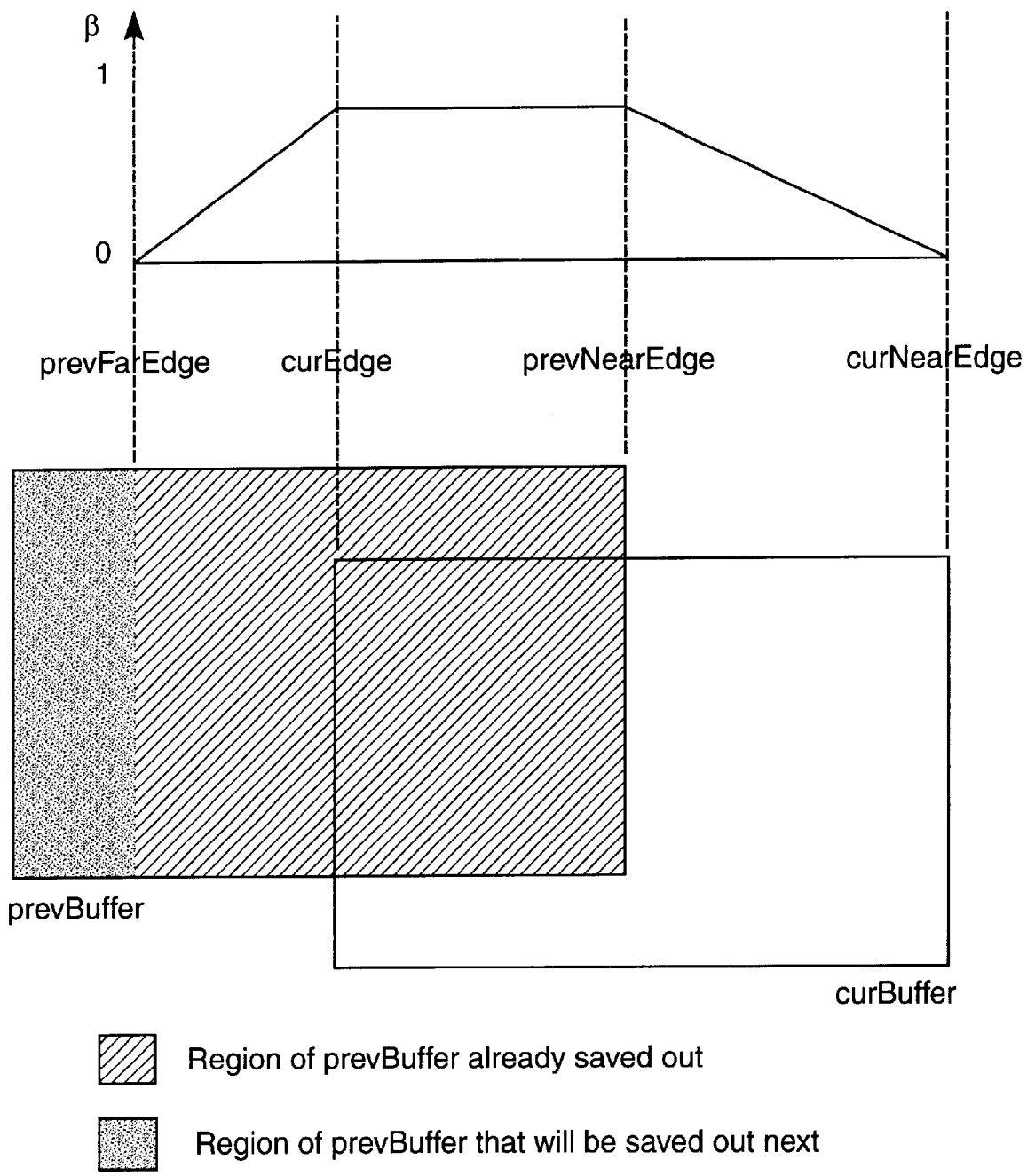
FIG. 39 is a schematic illustrating the color correction applied at various regions of the Previous Buffer and Current Buffer, according to the present invention.

FIG. 38 is a block diagram 3800 of the Color Correction architecture of FIG. 21 according to the present invention. The Color Correction Parameters Estimation architecture is described in FIG. 39. The outputs of these blocks are simple sets of values and these values will be used in the color Correction block. The values extracted form the current and previous pictures are called: BrightnessCurrent (Bc), ContrastCurrent (cc), BrightnessPrevious(Bp), ContrastPrevious (Cp). These abbreviations are used in FIGS. 38 and 40. These values can be stored in any general purpose register (not shown).

D.2. Algorithm for Color Correction Estimation

The color correction model that is adopted in the Camera 100 involves brightness and contrast histogram matching. Other more sophisticated techniques exist but histogram matching was chosen because of its independence on motion estimation results and could therefore be computed in parallel.

Denote I_prev as a color channel of the previous buffer (prevBuffer 1802), and I_cur as the same color channel of the Current Buffer (curBuffer 1808). Assume a default overlap between the previous and Current Buffers; this default could be the default position of the Current Buffer with respect to the previous buffer. Within the area of overlaps in the two images, compute:

E_prev=1/N Sum (I_prev); E2_prev=1/N Sum (I_prev×I_prev)

Var_prev=E2_prev−(E_prev×E_prev)

E_cur=1/N Sum (I_cur); E2_cur=1/N Sum (I_cur×I_cur)

Var_cur=E2_cur−(E_cur×E_cur)

The brightness and contrast to apply to the Current Buffer to match the previous buffer is given as:

Brightness=E_prev−Contrast×E_cur

Contrast=sqrt (Var_prev/Var_cur)

Instead of color correcting the Current Buffer only, we apply color correction to both buffers equally using the following equations:

ΔI=(Brightness+Contrast×I)−I

I'=I+β×ΔI

Color correction is later applied according to the following equations:

I'_prev=Brightness_prev+Contrast_prev×I_prev

I'_cur=Brightness_cur+Contrast_cur×I_cur

This color correction technique is applied to each color channel independently. For example, if the buffers are YCC, separate brightness and contrast parameters for each of the channel is calculated.

D.3. Algorithm for Color Correction

In this section, a description of the color correction that is applied to the previous and Current Buffers. The parameters of the color correction are the respective brightness and contrast adjustments for each color channel that was computed earlier by matching the buffers' histograms.

Figure 40:
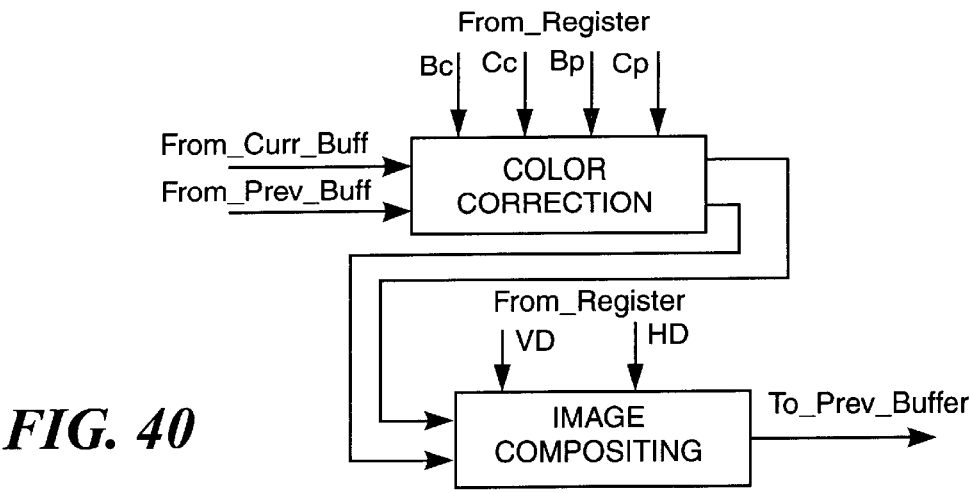
FIG. 40 is a block diagram of the Stitching and Blending architecture of FIG. 21, according to the present invention.

Turning now to FIG. 40, shown is an illustration of the amount of color correction applied at various regions of the previous and Current Buffer.

Color correction is applied to varying degrees in different parts of each buffer. Within the region of overlap, color correction is applied fully (β=1); outside of the region of overlap, color correction is applied less further away from the overlap (0<=β<1).

| | |
|---|---|
| Brightness_prev | = Brightness / sqrt(Contrast) |
| Contrast_prev | = 1 / sqrt (Contrast) |
| Brightness_cur | = Brightness / sqrt(Contrast |
| Contrast_cur | = sqrt(Contrast). |

A variant of this scheme does not apply full color correction even within the overlapping region. Instead, only up to 75% of color correction is ever applied. Thus, beta ranges from 0 to 0.75 outside of the overlapping region, and is 0.75 within. Using this technique, the previous and Current Buffers are not sufficiently color corrected to match each other. This is acceptable because the subsequent image compositing step transitions smoothly the previous buffer into the Current Buffer. Not completely color correcting the two buffers is useful as it produces a smoother color transition between the two buffers.

E.1. Image Splicing Architecture

FIG. 40 is a block diagram of the Stitching and Blending architecture of FIG. 21, according to the present invention.

E.2. Algorithm for Image Compositing

Figure 41:
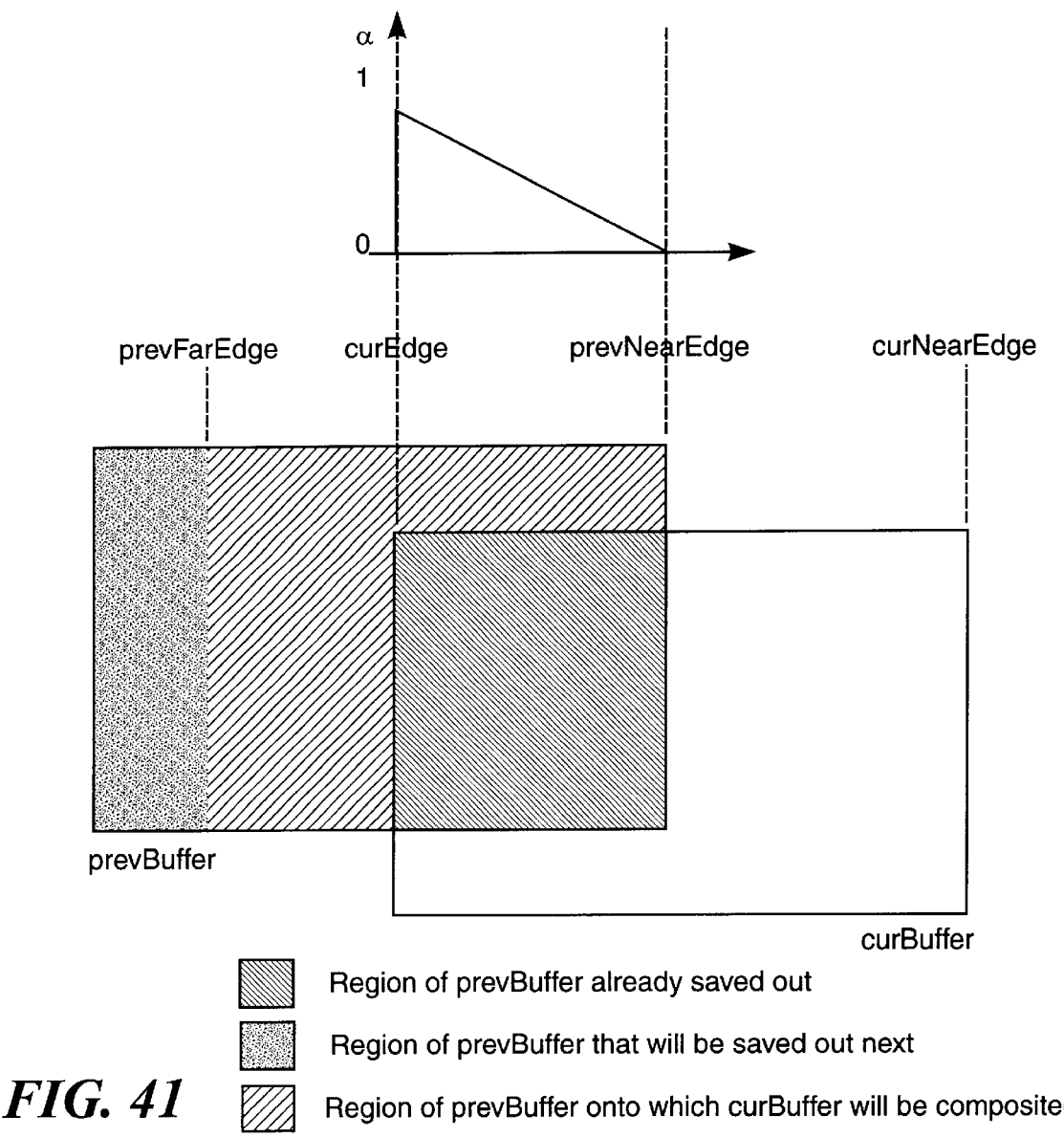
FIG. 41 is a schematic illustrating the regions of the Previous and Current Buffer, during image compositing, according to the present invention.

FIG. 41 is an illustration showing the regions of the previous and Current Buffer during image composition, according to the present invention. This section describes the image compositing between previous and Current Buffer that is carried out to construct the seamless Panorama. Since the region of the previous buffer between prevFarEdge and prevNearEdge will be written out next, the composited result is updated onto the previous buffer. Only the overlap region between the previous and Current Buffers are composited. The two buffers are composited according to the following equation:

I'_prev=α* I_prev+(1−α)* I_cur where α is a weighting factor that varies linearly between one and zero as shown in FIG. 41.

E.3. Algorithm for Image Splicing

Figure 42:
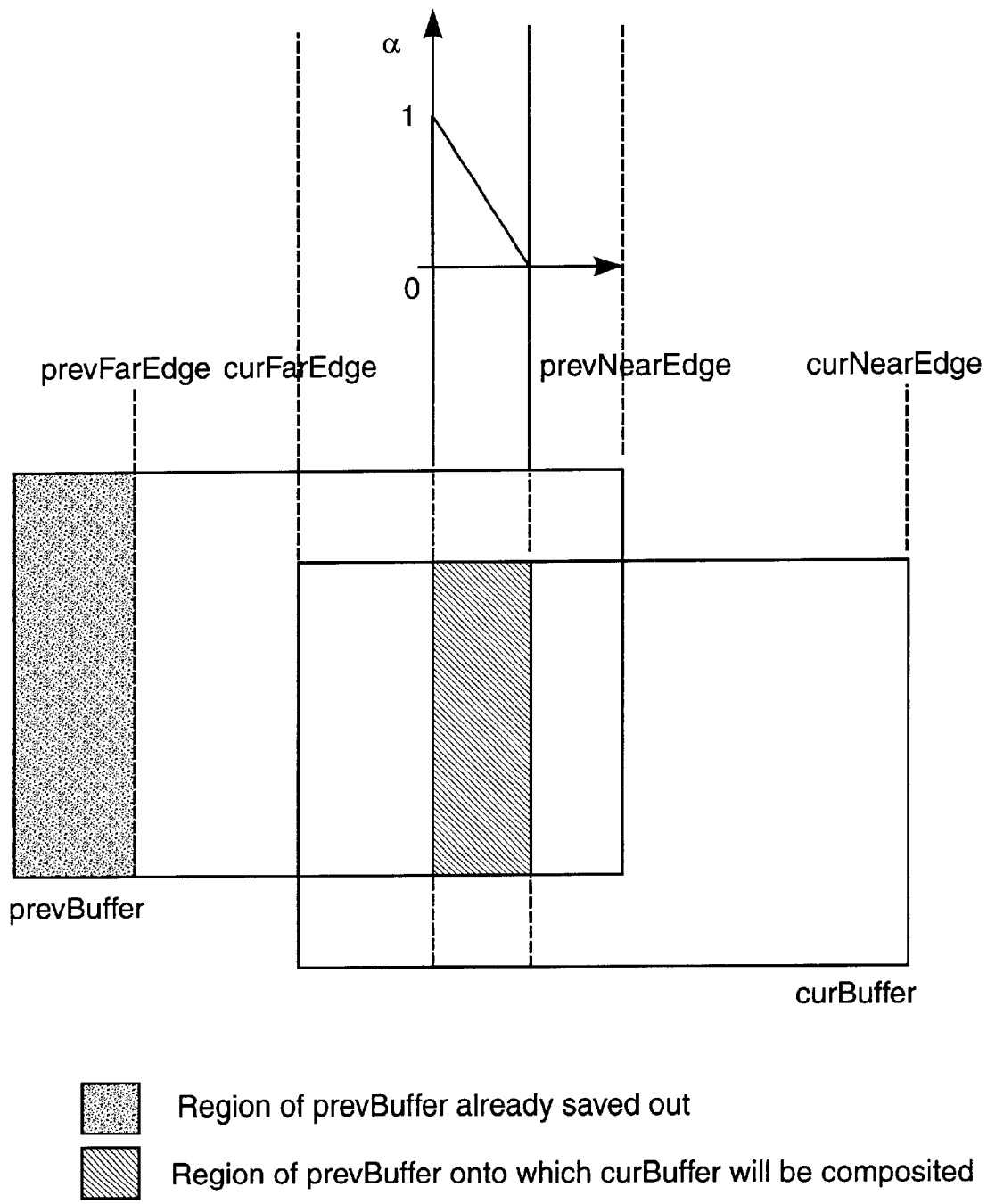
FIG. 42 is a schematic illustrating the regions of the Previous and Current Buffer being composited over a narrower region, according to the present invention.

This section describes a modification of the image compositing technique described earlier. During image compositing, the previous and Current Buffers are alpha-blended within their region of overlap. While this results in a smooth transition between the two buffers, it produces ghosting when the content in the two buffers differ. For example, if a person is in the overlap region within one buffer and not the other, a ghost-like reproduction of that person will be present in the final Panorama. If the compositing takes place over a narrower region of the overlap region to the left or to the right of the person, then the resulting Panorama will either contain the person entirely or not include the person (respectively). FIG. 42 shows an illustration of two buffers being composited over a narrow region.

Turning now to FIG. 42, shown is illustration of the previous and Current Buffer being composited over a narrower region. The location of the center of the narrower compositing region could be taken as the location that yields the least SAD error of a given error function. One such error function would be the sum of absolute differences across all corresponding pixels of each vertical column within the overlapping region. This would be computed with the Current Buffer at its optimum displacement with respect to the previous buffer. The width of the compositing region could be fixed or determined from the same error function. For example, if the minima of the error function (with which we determine the location) is narrow, then the width should be narrow. Conversely, if the minima is wide, then the width of the compositing region should be larger.

Figure 43:
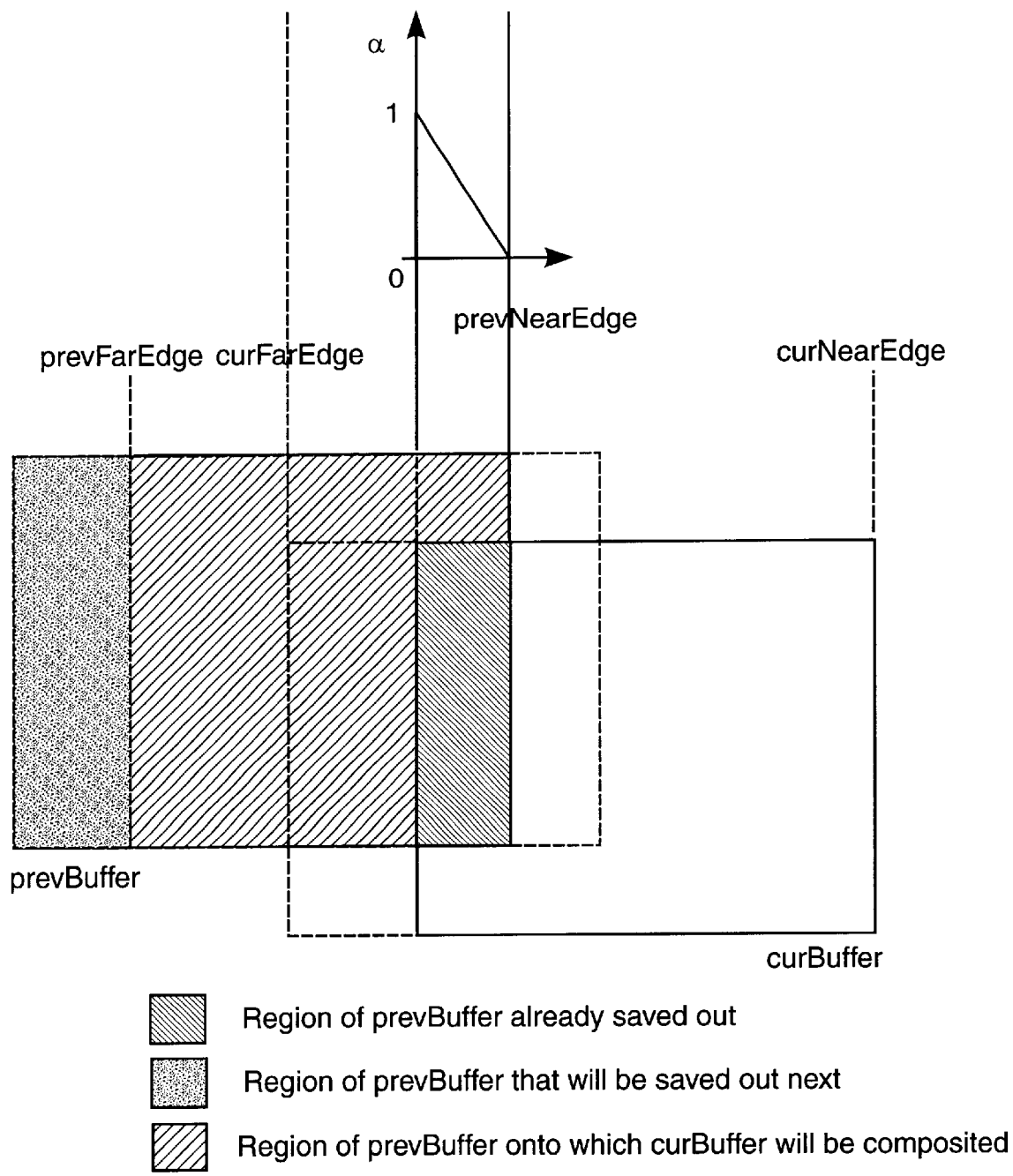
FIG. 43 is a schematic illustrating the regions of the Previous and Current Buffer contributing to the final panorama, according to the present invention.

FIG. 43 illustrates the regions of the previous and Current Buffer contributing to the final Panorama. Note that when compositing over the narrower compositing region, the prevNearEdge is no longer the right edge of the previous buffer. Instead, it is set to be the right edge of the compositing region. Thus, only the region of the previous buffer between the prevFarEdge and the prevNearEdge is saved out.

F.1. Algorithm for Cylindrical to Rectilinear Transform

Figure 44:
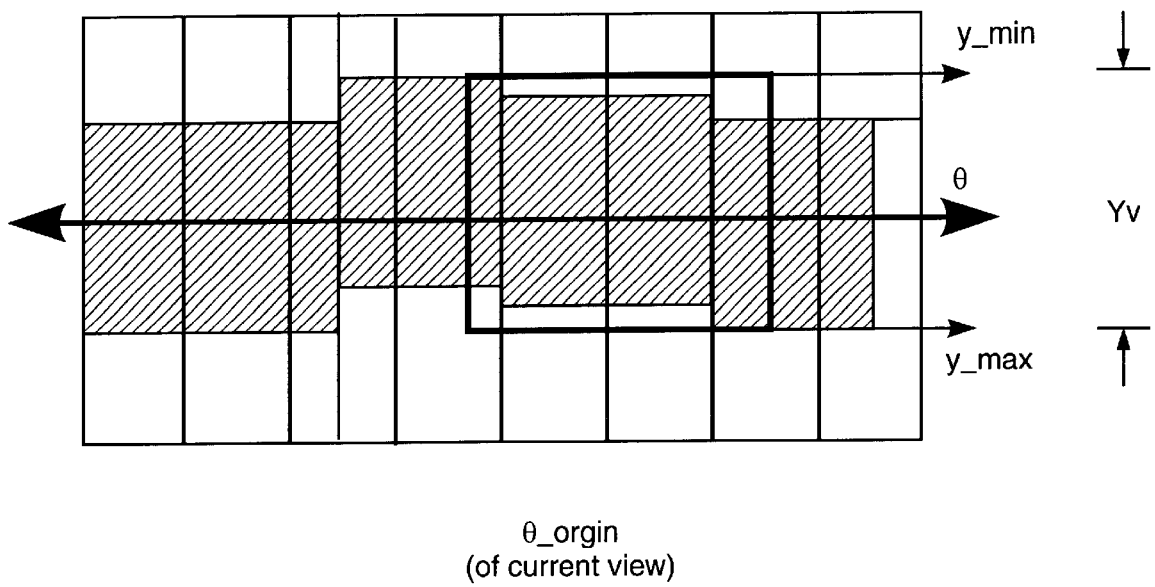
FIG. 44 is a schematic illustrating the Current View within the Panorama, according to the present invention.

Turning now to FIG. 44, shown is an illustration of the Current View within the Panorama. The Cylindrical to Rectilinear Transform transforms a portion of a cylindrical Panorama into rectilinear coordinages. This transform is basically the inverse of the Rectilinear to Cylindrical Transform described in a previous section. The panoramic viewer renders each new view of the Panorama using this transform. Each new view is parameterized by the origin in cylindrical coordinates ($\theta\_origin$), the focal length (f), and the dimensions of the viewport. Panning the panoramic viewer involves changing the $\theta\_origin$ parameter and re-rendering the new view.

Like the Rectilinear to Cylindrical Transform, the Cylindrical to Rectilinear Transform uniformly rescales each vertical scanline in the image independently. Thus, the transform is described by: (a) the location of the source scanline corresponding to each destination scanline, and (b) the scale factor for each scanline.

F.2. Calculating the X-coordinate Transformation $$\theta\_src = atan\ 2(x\_dst, f) + \theta\_origin$$

The location of each source vertical scanline (q_src) depends on the destination scanline (x_dst), the focal length (f), and the origin ($\theta\_origin$).

F.3. Calculating Y-scanline Rescaling $$y\_src = y\_scale * y\_dst$$

Each vertical scanline is a uniformly rescaled copy of the original. The scale factor is unnormalized by the factor y'_scale_min that was applied in the forward transform.

$$y'\_scale = f / \sqrt{\tan^2\theta\_src + 1}$$
$$= f^2 / \sqrt{x\_dst^2 + 1}$$

$$y'\_scale\_min = \min(f/\sqrt{\tan^2\theta\_min+1}, f/\sqrt{\tan^2\theta\_max+1})$$

$$y\_scale = y'\_scale\_min / y'\_scale$$

Thus, the scale factor depends on the location of the destination scanline (and ultimately, the location of the source scanline), and the focal length. The denominator of y'_scale can be precomputed as a look-up table, indexed by the location of the destination scanline (x_dst).

6. MOTION PLAY-BACK OF STILL PICTURES THAT HAVE BEEN PREVIOUSLY STORED

The digital camera has previously stored images such as images A, B, C, D of FIG. 3 that have been stitched together as described above. The following section describes how these previously stored images can be displayed with a perspective and motion of a video camera that could have captured the images comprising the panoramic scene. It is assumed that these images are available. This process of motion play-back (MPB) is based upon the continuously scanning of the picture in order to simulate the motion of a video camera acquiring the scene that is displayed.

Figure 45:
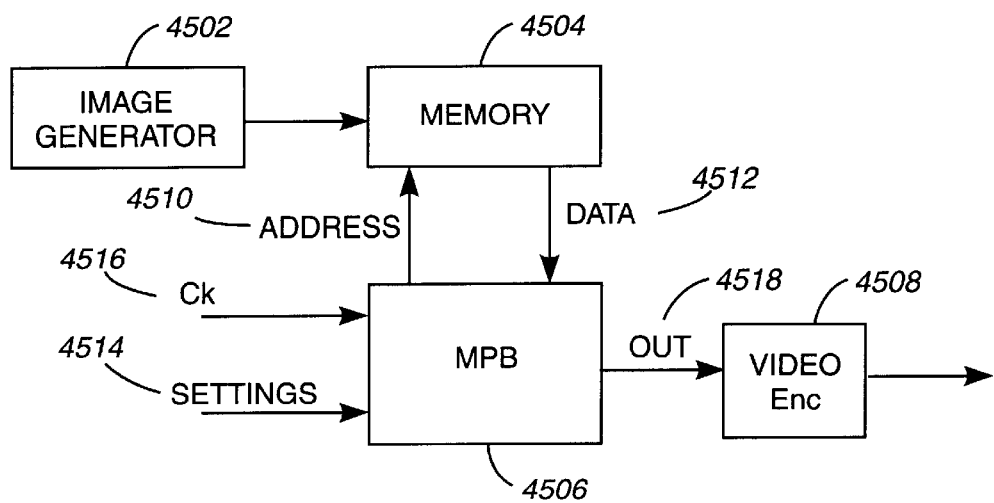
FIG. 45 is a high level block diagram of an architecture for a system using a motion playback device according to an aspect of the invention.

Turning now to FIG. 45, shown is a high level architecture of a system 4500 for implementing motion play-back (MPB), according to the present invention. An Image Generator 4502 contains all the resources (H/W and S/W) to: (1) create the picture by stitching several pictures together and then transfer it to the Memory 4504; or (2) up-load a picture from a non volatile memory, such as storage media 142, decode it and send it to the memory 4504. The memory 4504 is a standard block that contains the pictures. The memory 4504 is connected to a motion play-back (MPB) 4506 by address 4510 and data lines 4512. The MPB 4506 generates the addresses to properly read the picture in order to simulate the motion according to the parameters provided with the settings 451A. The settings 4514 provides information related to:

Speed of motion.
Frame Frequency.
Raster Structure: Interlaced/Progressive.
ViewPort Horizontal and Vertical (Xv–Yv) dimension. Shown is a viewport (the rectangle with $\theta\_origina$ at is venter where Xv and Yv are the viewport dimensions.
Picture Horizontal and Vertical (Xv–Yv) dimension.
Source Picture Reference System: Cylindrical, Planar, Spherical.
Picture Starting address.
Focal Length (f) of the optic used to take the picture.

The picture information is provided to the MPB 4506 by the data line 4512 and the MPB 4506 processes them according to the settings 4514.

Figure 46:
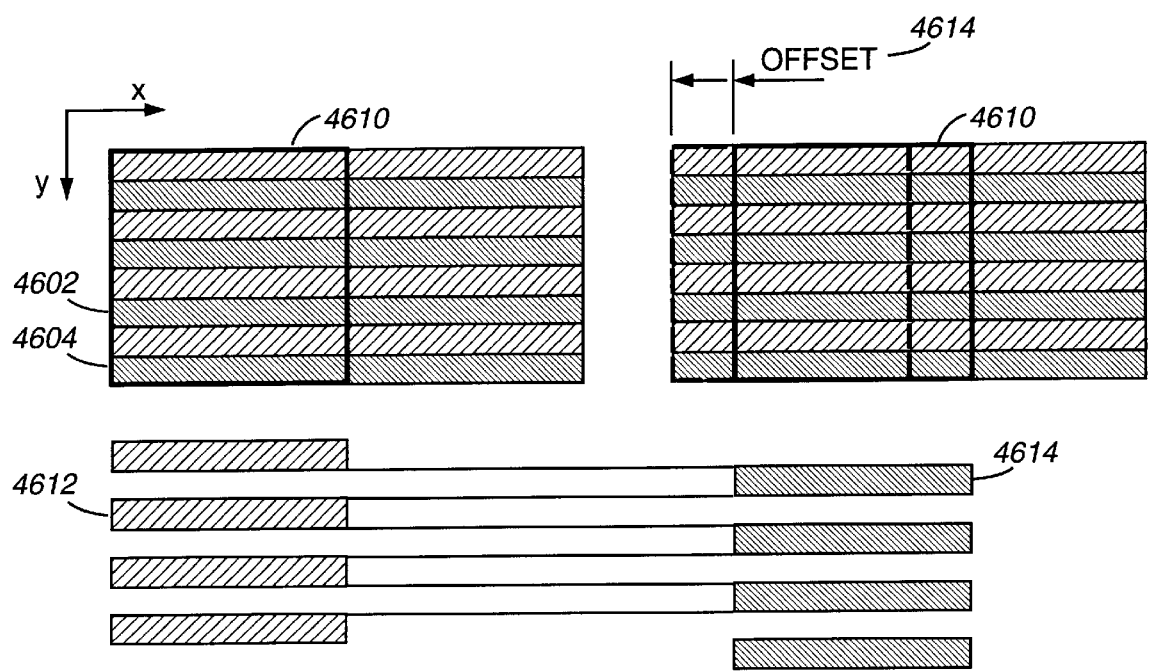
FIG. 46 is a diagram illustrating a motion picture simulation principle, according to the invention.

Now an example is provided in order to describe how the MPB 4514 works. FIG. 46 depicts a picture having the horizontal extent, i.e. along the X direction, equals 2 times the horizontal extent of the viewport. It is assumed the viewport is an LCD 126 or output, such as PAL or NTSC, to a TV set with interlaced scanning. Interlace is illustrated as even rows 4062 and odd rows 4064. During the first field (the odd one, for example) the portion of the picture to be displayed is depicted in the left-most part of FIG. 46 in window 4606. For the even field (the next one) the portion to be displayed is shifted by an offset 4608 to show the following window 4610. This process is repeated so that the viewport (i.e. window 466) is repeatedly moved by offset 4608 to form subsequent view 5 as desired. The actual interfaced even rows 4604 that are displayed for viewing window 466. Similarly, for viewing window 4610, the odd rows 4604 are displayed.

Figure 47:
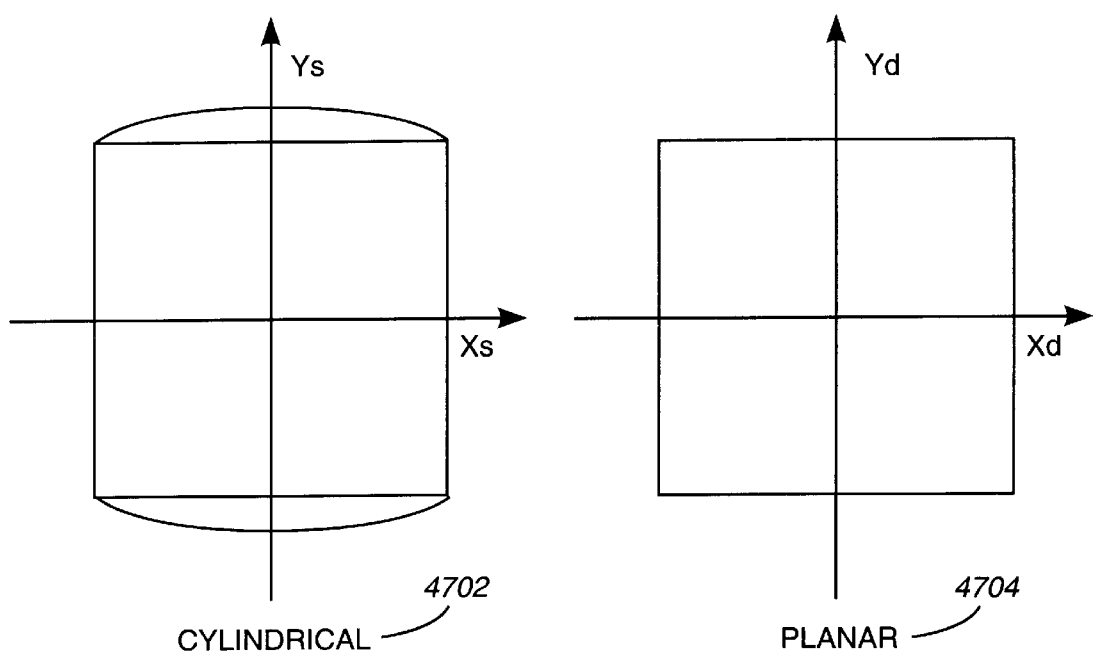
FIG. 47 illustrates cylindrical and planar picture representations of a panoramic picture, according to the present invention.

The MPB is described now based on the following assumptions: (1) Raster Structure: Interlaced; and (2) Source Picture Reference System: Cylindrical. FIG. 47 is an illustration of the coordinate systems 4700 used for the stored pictures 4702 and the raster display pictures 4704, according to the present invention. The stored images 4702 are the previously stitched frames. In order to properly display a picture, the cylindrical-to-planar conversion must be implemented. Generally, this graphic transformation is applied in inverse mode, i.e. starting from the position of the destination picture (corresponding to the position of a point of the display, in this case) the corresponding point in the source picture is found. The equations describing the cylindrical-to-planar mapping applied in the inverse mode are:

$$Xs = \arctan(X/f) + \text{origin} \quad (1)$$

$$Ys = Y\_scale \times Yd \quad (2)$$

$$Y\_scale = \text{sqr}(f)/\text{sqrt}(\text{sqr}(Xd)+1) \quad (3)$$

Figure 48:
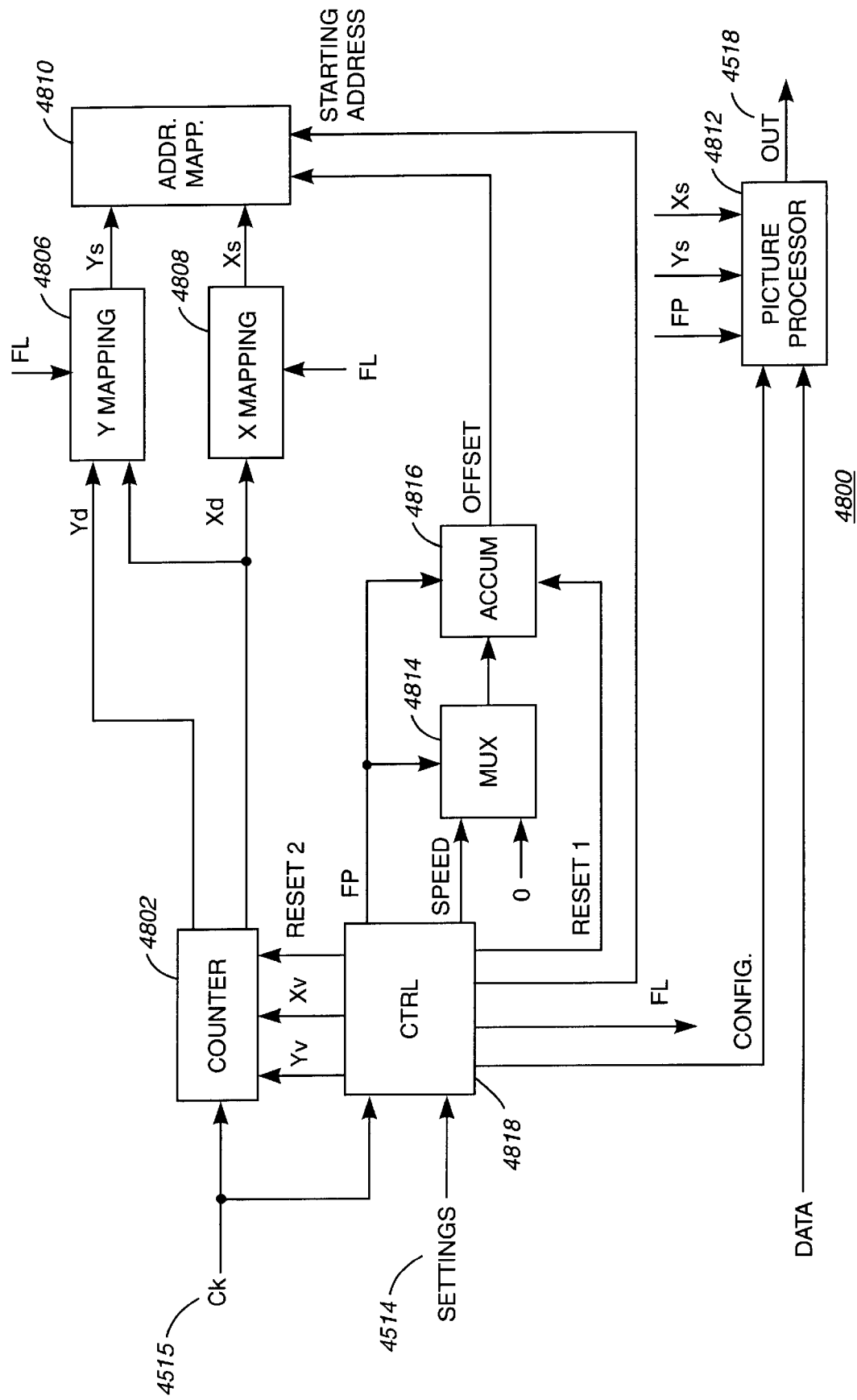
FIG. 48 is a detailed block diagram of the motion playback device internal architecture of FIG. 45, according to the present invention.
Figure 49:
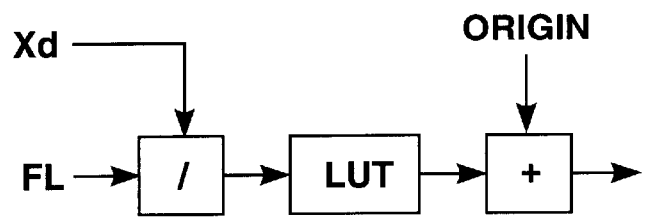
FIG. 49 shows an X mapping block architecture of FIG. 49, according to the present invention.
Figure 50:
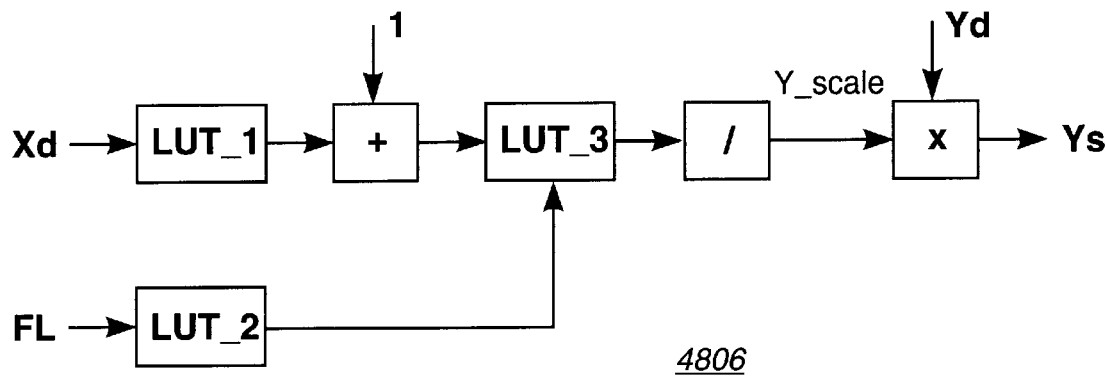
FIG. 50 shows a Y mapping block architecture of FIG. 49, according to the present invention.

Depending on the speed of the motion to be simulated, an offset 468 must be added to the address related to the pixel position along the horizontal direction of source picture. This offset 4608 depends on the Raster structure. For example if the raster is interlaced this offset 4608 must be updated for every field. On the other hand, if the raster is progressive, this Offset must be updated every frame. Where f represents the focal length. Equations (1), (2) and (3) above can be implemented in a variety of hardware and software combinations, including implementing the mathematical functions with a look up table, but this is not restrictive for the invention. FIG. 48 is a block diagram 4800 of the major components of MPB 4506 of FIG. 45, according to the present invention. A counter 4802 generates the coordinate of a point in the display coordinates 4704. The FP, 4818 signal directs when the offset 4608 must be updated. FIG. 49 is an illustration of the X-mapping 4808 for carrying out equation (1). FIG. 50 is an illustration of the Y-mapping 4806 for carrying out equations (2) and (3). Address Mapping 4810 translates the cylindrical coordinates Xs and Ys of 4702 to planar coordinates Xd and Yd 4704.

Other embodiments are possible. For example, if the input picture is in planar coordinates, equations (1), (2) and (3) do not implement any transformation in the MPB 4506. On the other hand if the input picture in spherical coordinates the MPB 4506 implements a different set of transforms. The physical address of a picture coordinate is used to retrieve a pixel from the memory. Due to the nature of the transform, it is possible the location Xs and Ys does not correspond to a pixel already existing on the source image. This location can be between to pixels. To recover this drawback, the Pixel Processor block implements an interpolation algorithm in order to compute the pixel value at the position Xs, Ys. Moreover the Picture Processing 4812 implements the down-sampling along the vertical direction in order to fit the vertical size of the viewport.

Figure 51:
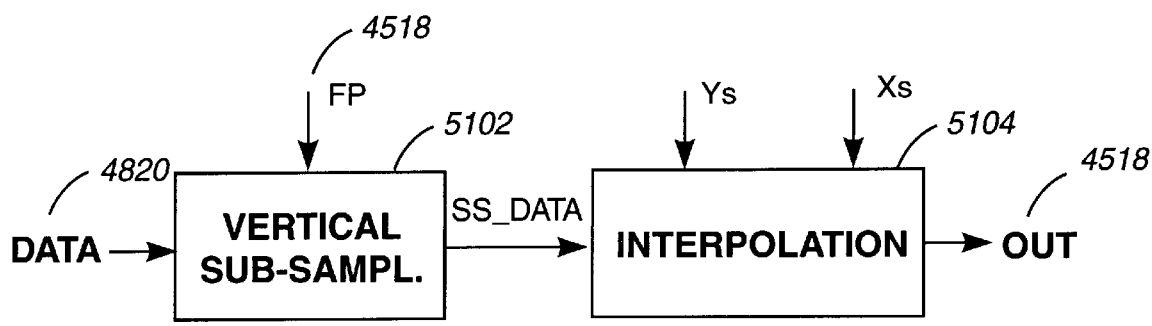
FIG. 51 is a block diagram of the picture processor of FIG. 49, according to the present invention.
Figure 52:
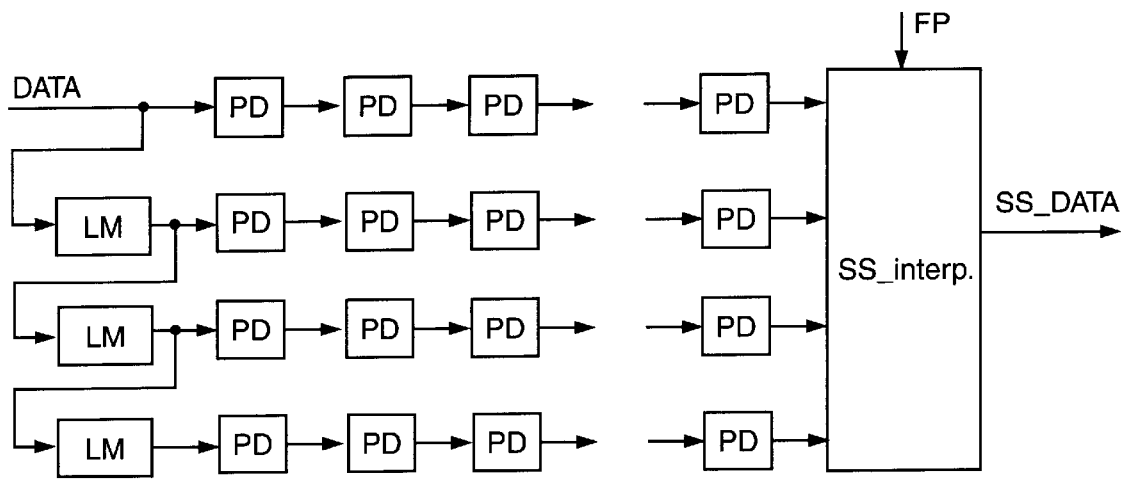
FIG. 52 shows a vertical subsampling architecture, of the picture processor of FIG. 50, according to the present invention.
Figure 53:
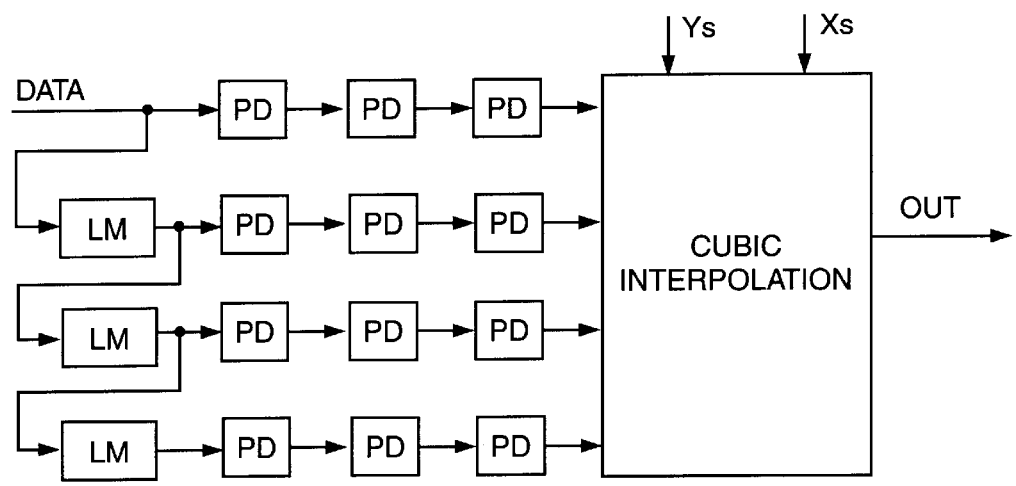
FIG. 53 shows an embodiment of a cubic interpolation system of FIG. 51, according to the present invention.
Figure 54:
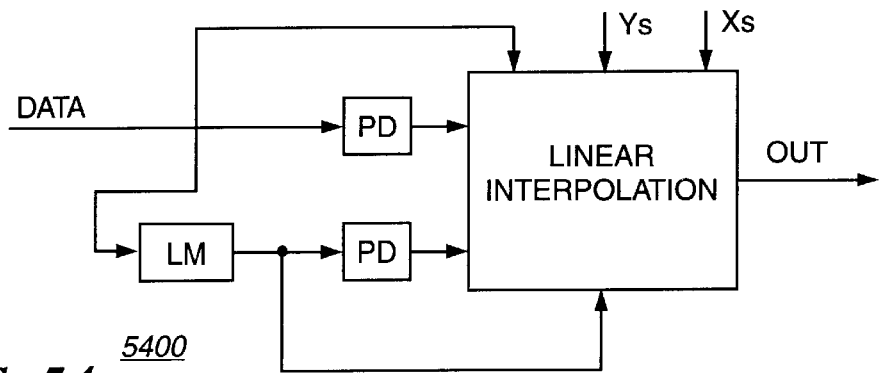
FIG. 54 shows an embodiment of a linear interpolation system of FIG. 51, according to the present invention.

One architecture of the Picture Processing 4812 is depicted in FIG. 51. And one architecture of the Vertical Sub-Sampling 5102 is depicted in FIG. 52. The vertical Sub-Sampling 5102 requires some Line Memories (LM) and Pixel Delays (PD) in order to implement the processing window required by the particular Interpolation algorithm implemented by the SS_Interp. block. Some of those algorithms require the Field/Frame Signal too. The Interpolation block, computes the value of the pixel at the Xs Ys position starting from the available ones in the source picture. A possible implementation of the Interpolation 5104 using a Cubic Interpolator is described in FIG. 53 while FIG. 54 illustrates a possible implementation of the Interpolation block using the linear interpolation algorithm.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A device for correcting color in a system for creating a panoramic image from a plurality of images taken by a camera, the device comprising:

an Input for receiving a color channel from at least a first image and a second image:

an overlap portion between the first image and second image;

means for adjusting the color channel for the first image and for the second image in at least the overlap portion between the first image and the second image which is independent of motion estimation, wherein the means for adjusting color comprises:

means for computing the brightness ($B_1$) and contrast ($C_1$) for the first color channel;

means for computing the brightness ($B_2$) and contrast ($C_2$) for the second color channel;

means for adjusting color correction in at least the overlap portion between the first image and the second image; wherein the color channel for the first image is set equal to: $I_1 = B_1 + C_1 \times I_1$: and wherein the color channel for the second image is set equal to $I_2 = B_2 + C_2 \times I_2$;

means for computing a histogram of color distribution for the first color channel ($H_1$);

means for computing a histogram of color distribution for the second color channel ($H_2$); and wherein $B_1$ and $B_2$ are set equal to: $H_2$—(matched contrast (C))×$H_1$; and wherein the C is set equal to the square root of a variance calculated for $H_1$ divided by a variance calculated for $H_2$.

2. A device for correcting color in a system for creating a panoramic image from a plurality of images taken by a camera, the device comprising:

an input for receiving a color channel ($I_1$) from a first image and a color channel ($I_2$) from a second image;

an overlap portion between the first image and second image;

a processor coupled to $I_2$ and $I_2$ for calculating:

a histogram of a color distribution for the first color channel ($H_1$);

a histogram of a color distribution for the second color channel ($H_2$);

a variance ($V_1$) of $H_1$ and variance ($V_2$) of $H_2$;

a matching contrast (C) set equal to: sqrt ($V_1/V_2$);

a matching brightness (B) set equal to: $I_1-C\times I_2$; and means for applying the C and B in at least the overlap portion between the first image and the second image.

3. The device as defined in claim 2, wherein the processor includes calculating a delta color channel ($\Delta I$) set equal to $(B+C\times I_1)-I_1$ and $I_2=I_1+\beta\times\Delta I$ where $\beta$ is a constant with a value less than or equal to one.

4. The device as defined in claim 3, wherein $\beta$ is set a value of one in the region of overlap.

5. The device as defined in claim 3, wherein $\beta$ is set a value between 0 and 0.75 in an area outside the region of overlap for the first image and the second image.

6. A method for correcting color in a system for creating a panoramic image from a plurality of images taken by a camera, comprising the steps of:

receiving a color channel from at least a first image and a second image;

creating an overlap portion between the first image and second image; and adjusting the color channel for the first image and for the second Image In at least the overlap portion between the first image and the second image which is independent of motion estimation;

computing the brightness ($B_1$) and contrast ($C_1$) for the first color channel;

computing the brightness ($B_2$) and contrast ($C_2$) for the second color channel:

adjusting color correction in at least the overlap portion between the first image and the second image;

setting the color channel for the first image is set equal to: $I_1=B_1+C_1\times I_1$;

setting the color channel for the second image is set equal to: $I_2=B_2+C_2\times I_2$ computing a histogram of color distribution for the first color channel ($H_1$);

computing a histogram of color distribution for the second color channel ($H_2$); and setting $B_1$ and $B_2$ equal to: $H_2$—(matched contrast (C))$\times H_1$ wherein the C is set equal to the square root of a variance calculated for $H_1$ divided by a variance calculated for $H_2$.

7. A method for correcting color in a device for correcting color in a system for creating a panoramic image from a plurality of images taken by a camera, the device comprising:

receiving a color channel ($I_1$) from a first image and a color channel ($I_2$) from a second image;

creating an overlap portion between the first image and second image;

computing a histogram of the color distribution for the first color channel ($H_1$) and for the second color channel ($H_2$);

computing a variance ($V_1$) of $H_1$ and variance ($V_2$) of $H_2$;

computing a matching contrast (C) set equal to: sqrt ($V_1/V_2$);

computing a matching brightness (B) set equal to: $I_1-C\times I_2$; and applying the C and B in at least the overlap portion between the first image and the second image.

8. The method as defined in claim 7, further including the step of:

computing a delta color channel ($\Delta I$) set equal to $(B+C\times I_1)-I_1$ and $I_2=I_1+\beta\times\Delta I$ where $\beta$ is a constant with a value less than or equal to one.

9. The method as defined in claim 8, wherein the step of computing a delta includes setting the value of $\beta$ to one in the region of overlap.

10. The method as defined in claim 8, wherein the step of computing a delta includes setting the value of $\beta$ to between 0 and 0.75.

11. A computer readable medium containing programming instructions for correcting color in a system for creating a panoramic image from a plurality of images taken by a camera, the program Instructions comprising:

receiving a color channel from at least a first image and a second image;

creating an overlap portion between the first image and second image; and adjusting the color channel for the first Image and for the second image in at least the overlap portion between the first image and the second image which is independent of motion estimation.

computing the brightness ($B_1$) and contrast ($C_1$) for the first color channel;

computing the brightness ($B_2$) and contrast ($C_2$) for the second color channel;

adjusting color correction in at least the overlap portion between the first image and the second image;

setting the color channel for the first image is set equal to: $I_1=B_1+C_1\times I_1$;

setting the color channel for the second image is set equal to $I_2=B_2+C_2\times I_2$; and computing a histogram of color distribution for the first color channel ($H_1$) and for the second color channel ($H_2$) and $B_1$ and $B_2$ are set equal to $H_2$—(matched contrast (C))$\times H_1$ wherein the C is set to the square root of a variance calculated for $H_1$ divided by a variance calculated for $H_2$.

12. A computer readable medium containing programming instructions for correcting color in a system for creating a panoramic image from a plurality of images taken by a camera, the program instructions comprising:

receiving a color channel ($I_1$) from a first image and a color channel ($I_2$) from a second image;

creating an overlap portion between the first image and second image;

computing a histogram of the color distribution for the first color channel ($H_1$) and for the second color channel ($H_2$);

computing a variance ($V_1$) of $H_1$ and variance ($V_2$) of $H_2$;

computing a matching contrast (C) set equal to: sqrt ($V_1/V_2$);

computing a matching brightness (B) set equal to: $I_1-C\times I_2$; and applying the C and B in at least the overlap portion between the first image and the second image.

13. The computer readable medium of claim 12, further including the programming instruction of:

computing a delta color channel ($\Delta I$) set equal to $(B+C\times I_1)-I_1$ and $I_2=I_1+\beta\times\Delta I$, where $\beta$ is a constant with a value less than or equal to one.

14. The computer readable medium of claim 13, wherein the programming instruction of computing a delta includes setting the value of $\beta$ to one in the region of overlap.

15. The computer readable medium of claim 13, wherein programming instruction of computing a delta includes setting the value of $\beta$ to between 0 and 0.75.

* * * * *

UNITED STATES PATENT AND TRADEMARK OFFICE
CERTIFICATE OF CORRECTION

PATENT NO. : 6,456,323 B1
DATED : September 24, 2002
INVENTOR(S) : Massimo Mancuso et al.

It is certified that error appears in the above-identified patent and that said Letters Patent is hereby corrected as shown below:

Column 2,
Line 42, change "buffers for" to -- buffers to --

Column 3,
Line 1, change "make" to -- makes --
Line 5, change "but" to -- and --
Line 42, change "strip the" to -- strip and the --

Column 6,
Line 29, change "term" to -- terms --
Line 49, change "picture" to -- pictures --

Column 7,
Line 3, change "comprises one" to -- comprises of one --
Line 26, change "such at" to -- such as --
Line 38, change "store" to -- stored --
Line 40, change "and" to -- by --

Column 8,
Line 9, change "integrate" to -- integrated --
Line 9, change "drivers 126" to -- drivers 128 --
Line 45, change "image either" to -- image, either --
Line 46, change "frames with" to -- frames, with --
Line 58, change "image is not" to -- image has not --

Column 9,
Line 30, change "various way" to -- various ways --

Column 10,
Line 28, change "graphically" to -- graphical --
Line 58, change "and which and which" to -- and which --

Column 11,
Line 59, change "variations" to -- variation --

UNITED STATES PATENT AND TRADEMARK OFFICE
CERTIFICATE OF CORRECTION

PATENT NO. : 6,456,323 B1
DATED : September 24, 2002
INVENTOR(S) : Massimo Mancuso et al.

It is certified that error appears in the above-identified patent and that said Letters Patent is hereby corrected as shown below:

Column 13,
Line 8, change "eh" to -- the --
Line 38, change "feed to" to -- fed to --
Line 43, change "feed" to -- fed --

Column 16,
Line 27, change "in area of" to -- in areas of --
Line 27, change "there is" to -- there are --

Column 20,
Lines 64 and 67, change "exists" to -- exist --

Column 21,
Line 8, change "locall" to -- local --

Column 24,
Lines 45 and 46, change "origina at is venter" to -- original) --

Column 25,
Line 35, change "example if" to -- example, if --
Line 61, change "between to pixels" to -- between two pixels --

Signed and Sealed this

Twenty-first Day of October, 2003

JAMES E. ROGAN
*Director of the United States Patent and Trademark Office*